Oct. 1, 1946.  S. A. PEARSON  2,408,445
COMBUSTION CONTROL APPARATUS
Filed April 28, 1942   10 Sheets-Sheet 10
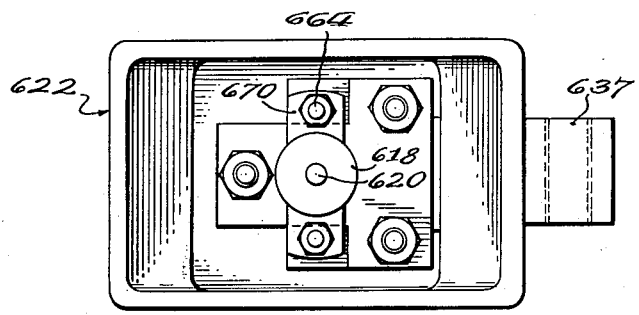
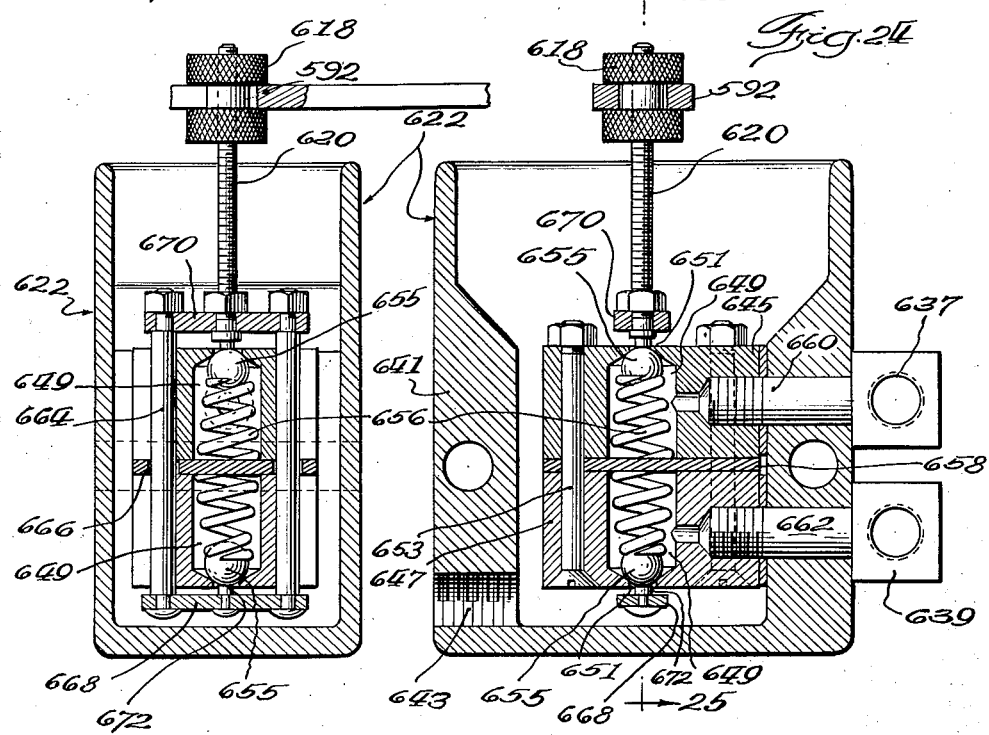
Inventor:
Swan A. Pearson
By Williams, Bradbury & Hinkle
Attys.

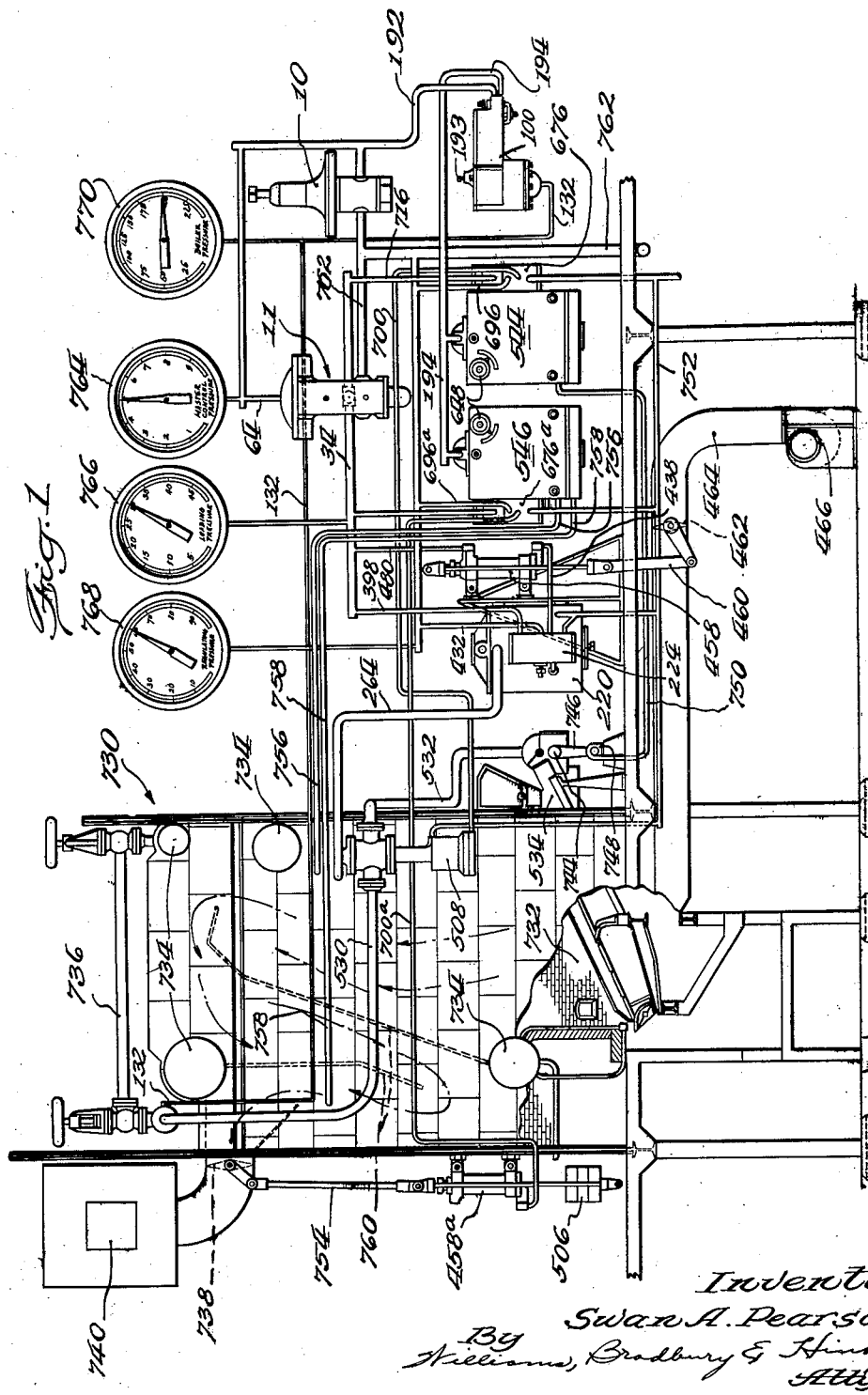

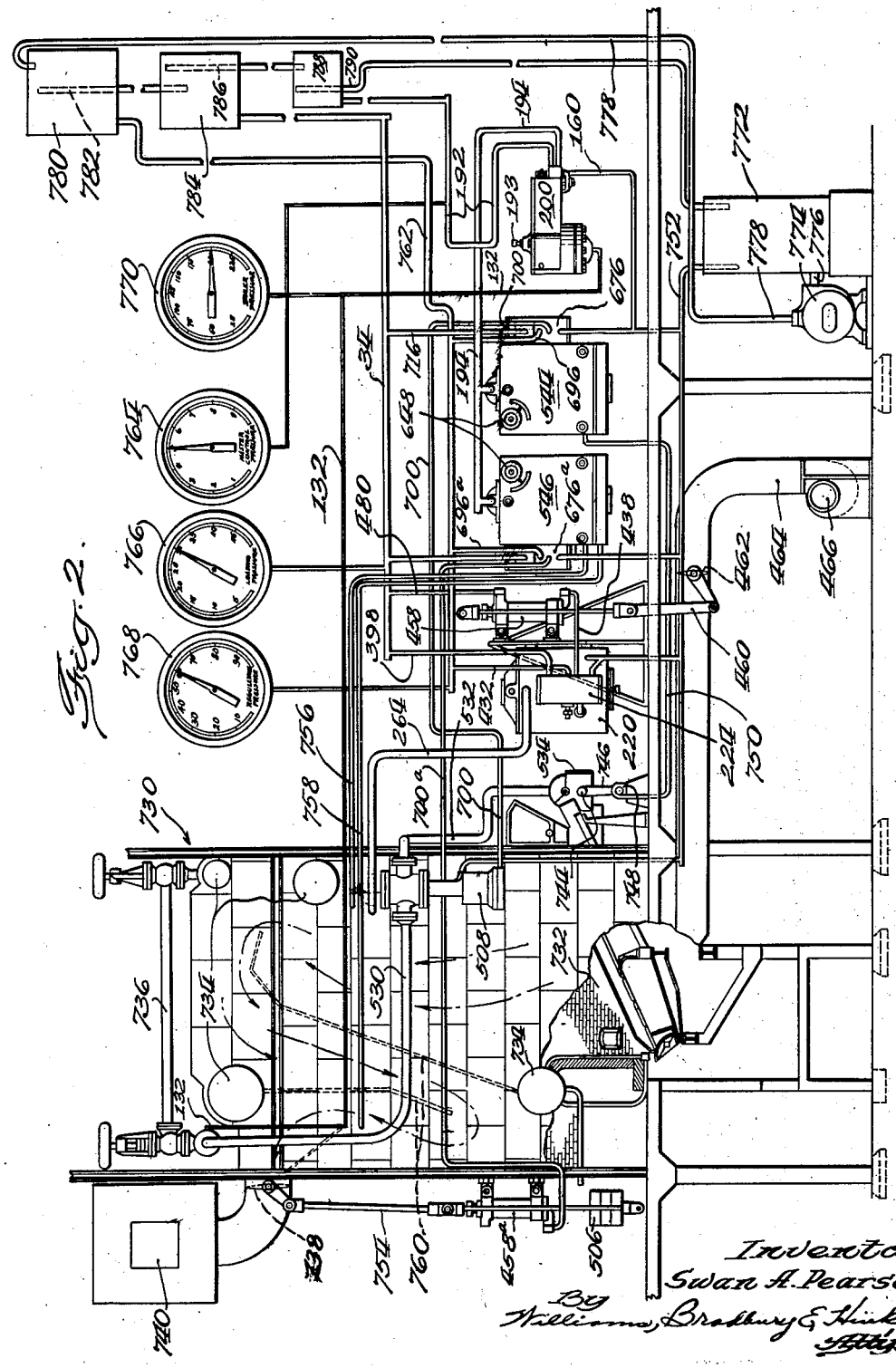

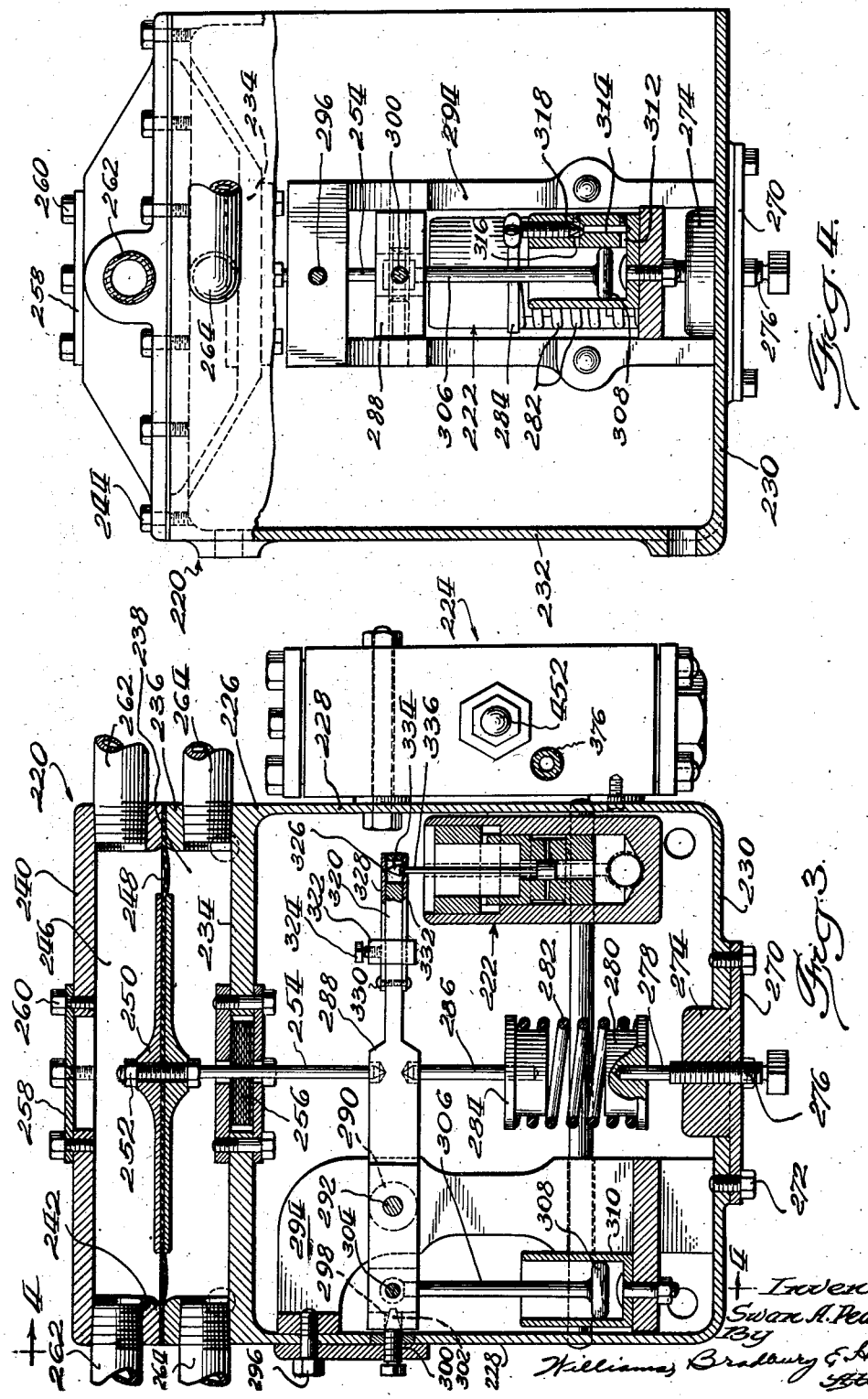

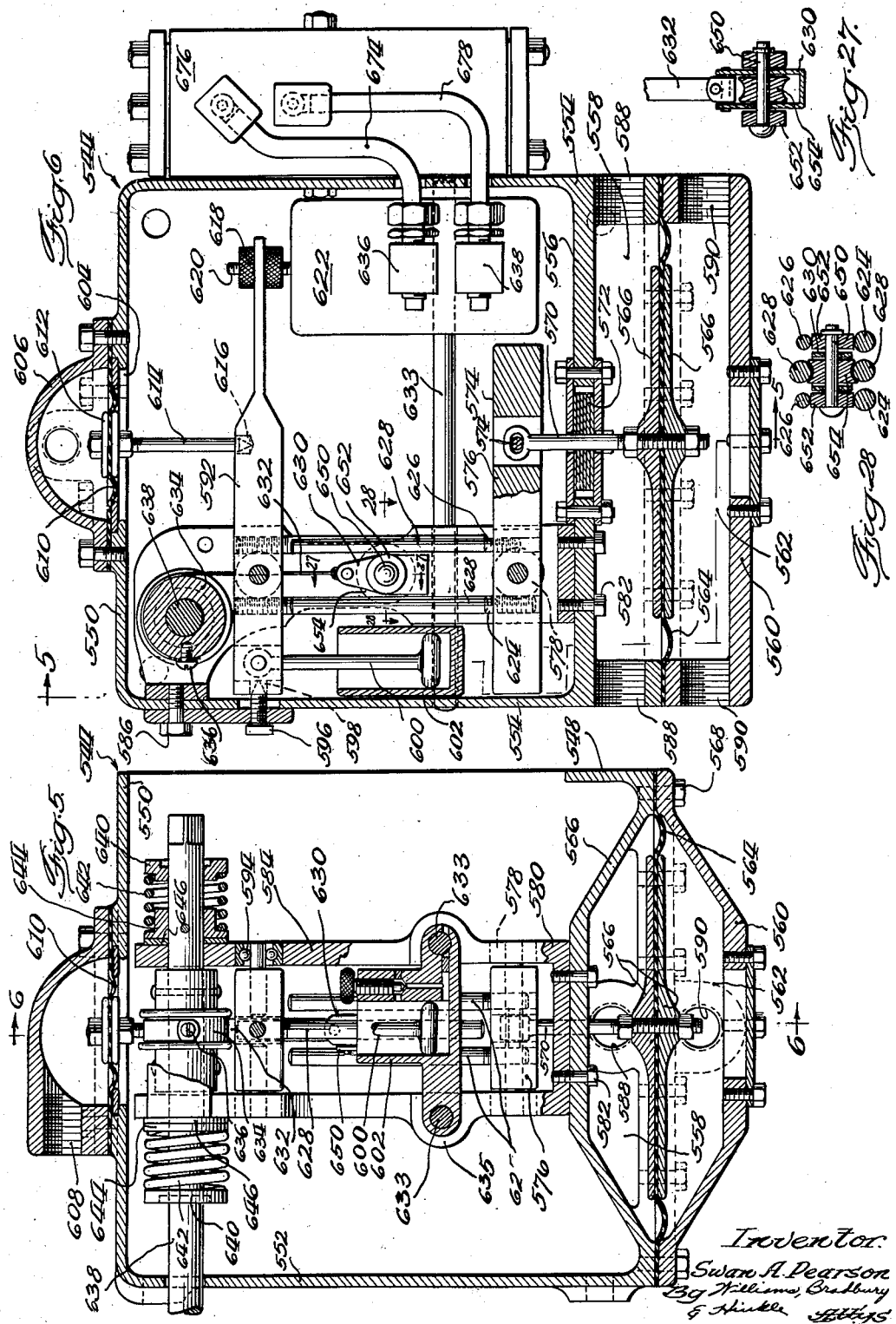

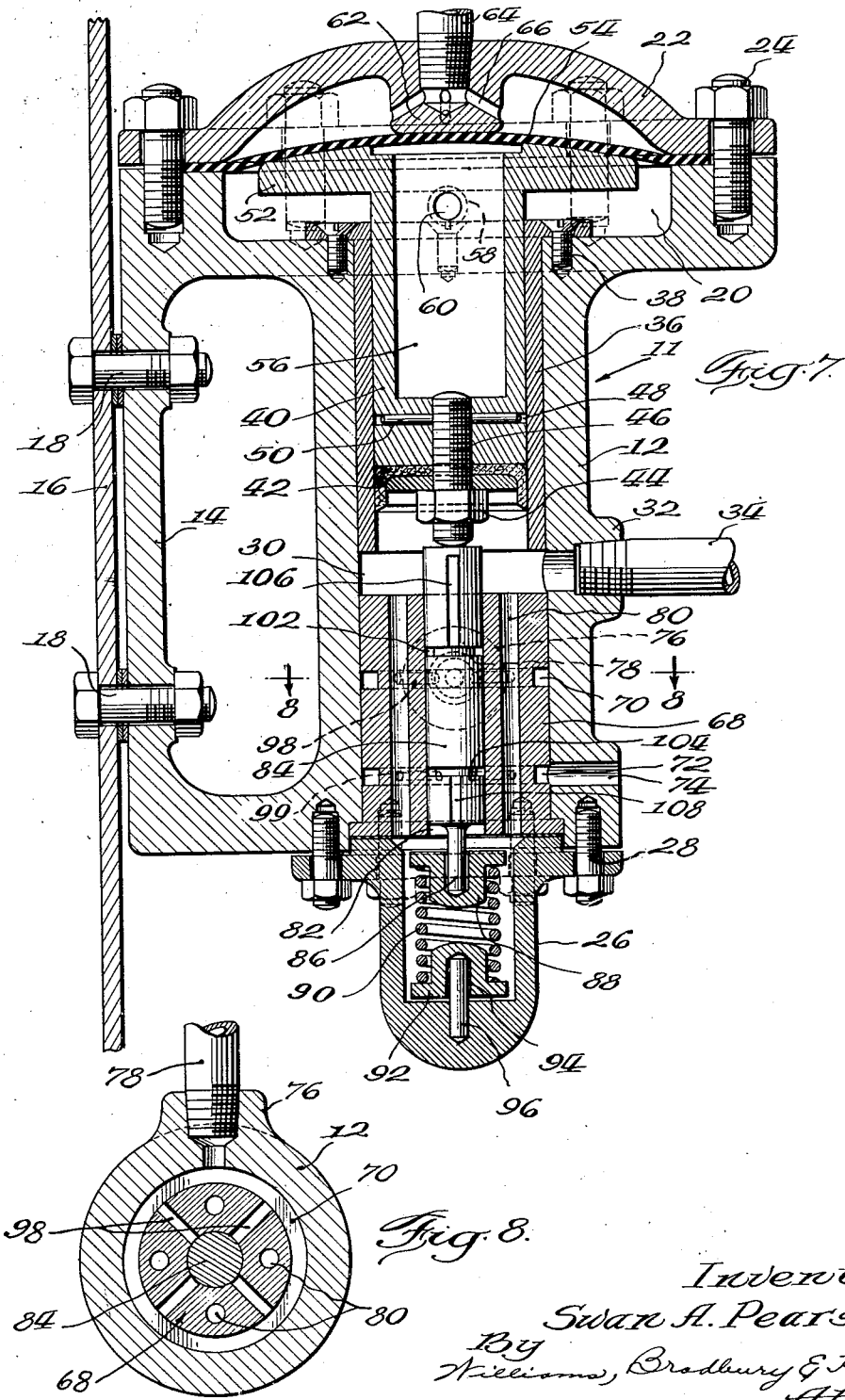

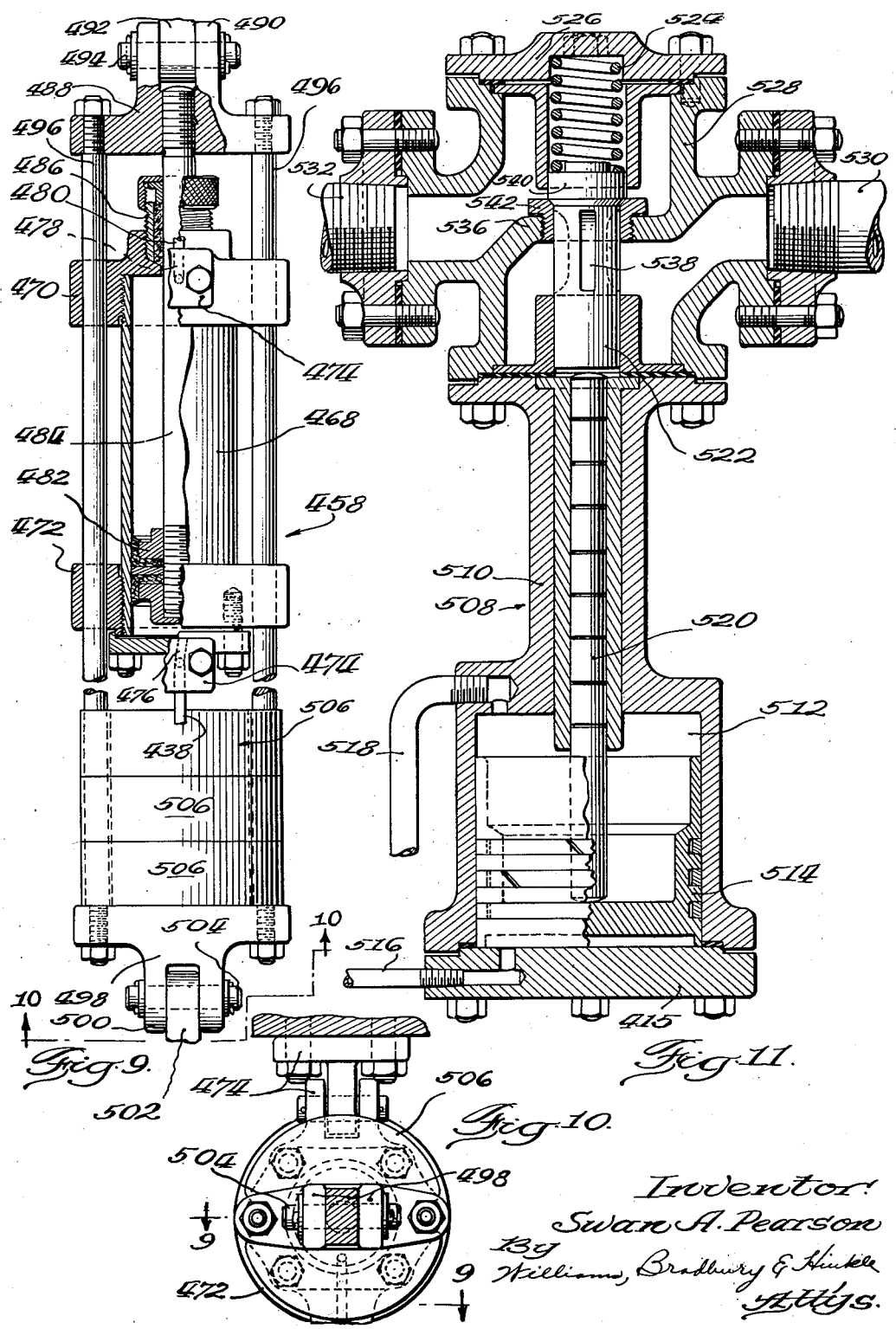

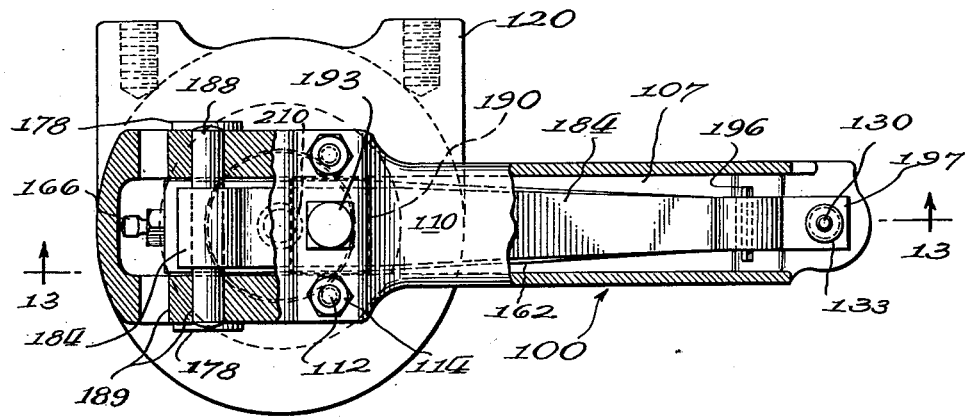
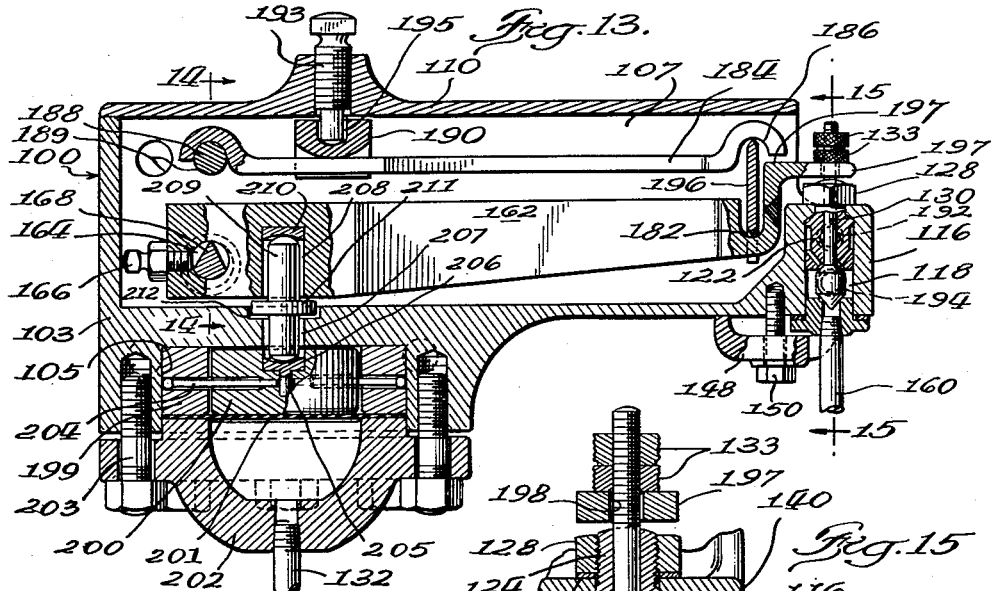
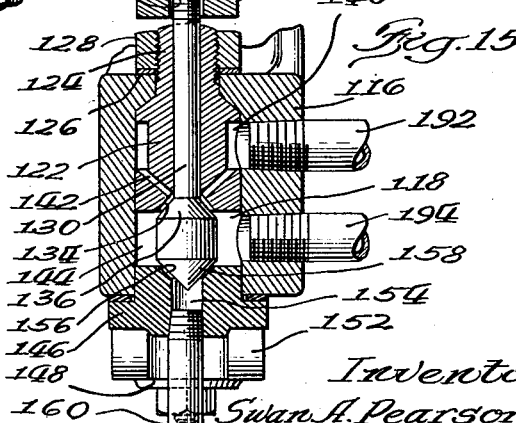

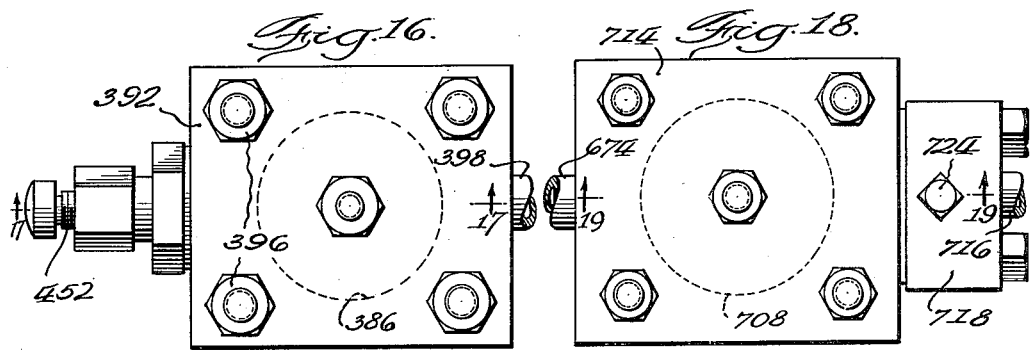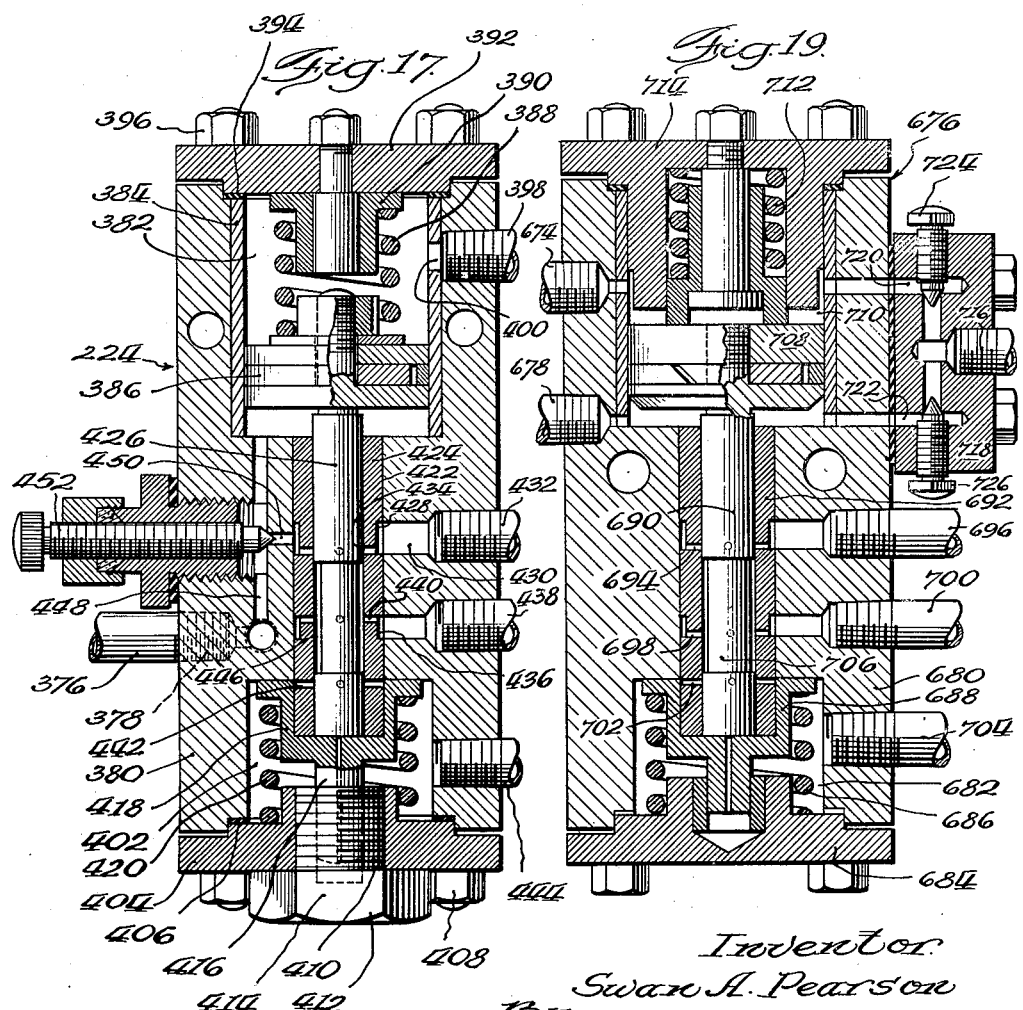

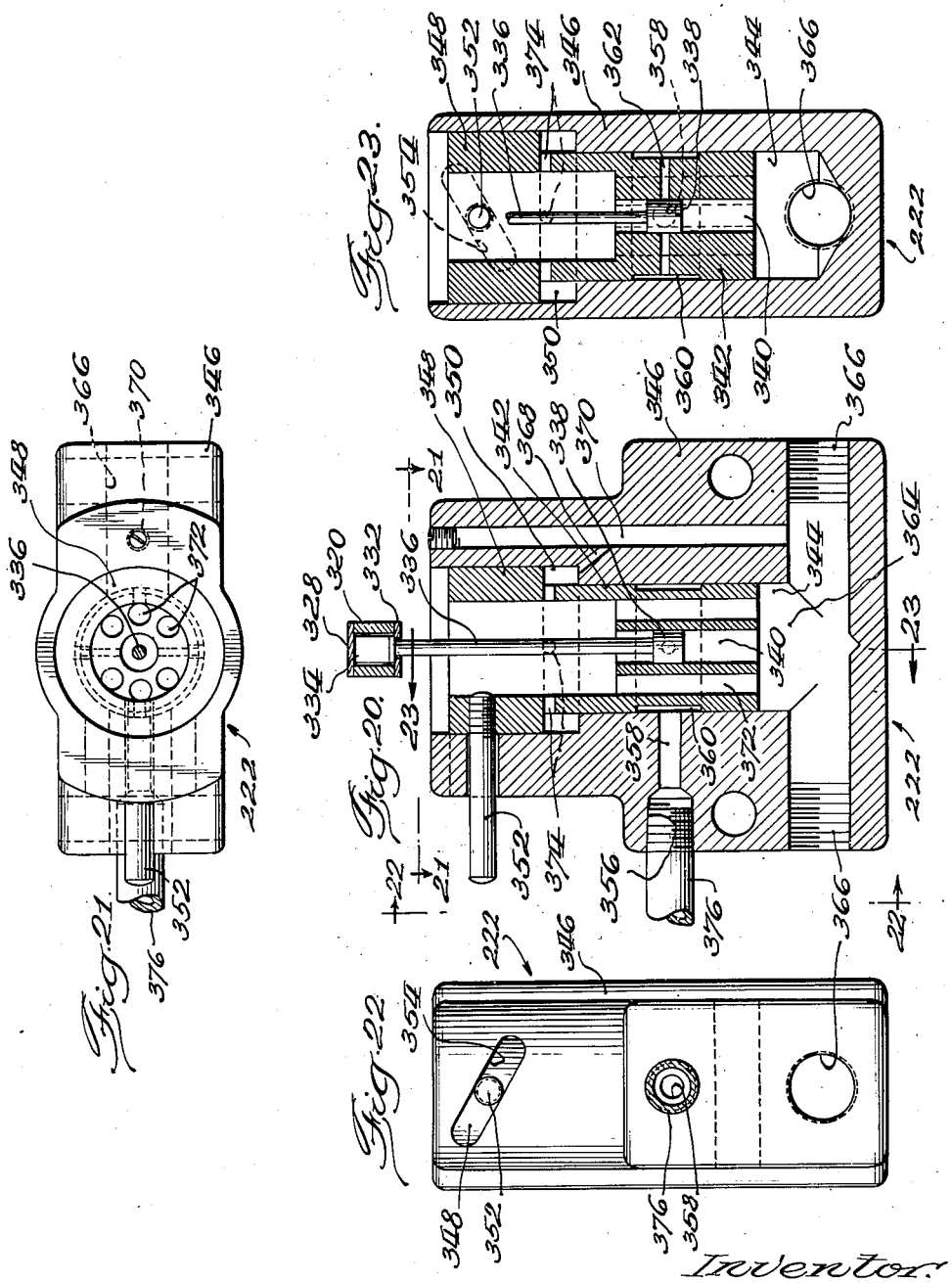

Patented Oct. 1, 1946

2,408,445

UNITED STATES PATENT OFFICE 2,408,445

COMBUSTION CONTROL APPARATUS

Swan A. Pearson, Chicago, Ill.

Application April 28, 1942, Serial No. 440,791

6 Claims. (Cl. 110—54)

The present invention relates to combustion control mechanism and is particularly concerned with the provision of apparatus for the purpose of controlling the draft and the feeding of fuel to steam boilers automatically so as to obtain efficient combustion regardless of the load.

I am aware that apparatus for this general purpose has been heretofore used, but it is the primary object of the present invention to provide apparatus for this purpose having distinct and important advantages over any mechanism of this type with which I am familiar.

An additional object of the present invention is to provide a novel mechanism for the correct proportioning of fuel and air so the maximum efficiency may be obtained under varying load conditions.

A further object of the present invention is to provide novel apparatus for this purpose which is more compact and simpler in its construction than any heretofore used.

A further object of the present invention is to provide novel apparatus of this type in which the adjustments for proper operation of the system are simple to effect, and wherein the adjustments for compensating for such variables as variations in fuel composition, temperature changes and the like are easily effected.

Still a further object of the present invention is to provide novel apparatus of this type which includes additional safety factors arrived at in part through simplicity of construction, and wherein novel arrangements are provided for causing the rate of combustion of fuel and the pressure in the boiler system to be reduced if for any reason the regulating pressures fail.

Still a further object of the present invention is to provide improved combustion control equipment which is extremely stable in operation and which has a high degree of sensitivity to changes in the control conditions.

Still a further object of the present invention is to provide improved combustion control equipment which is more flexible in its use in that the connections are simplified and wherein a great variety of control can be accomplished with comparatively few standardized units.

Still a further object of the present invention is to provide novel and improved combustion control apparatus which can be operated by either air control connections or by hydraulic control connections or by a combination of the two.

Other objects and advantages will become apparent from the following description of a preferred embodiment of my invention taken in conjunction with the accompanying drawings in which:

Fig. 1 is a diagrammatic view of a boiler and one form of control apparatus for effecting the control of this boiler. The apparatus shown in Fig. 1 is particularly adapted to use air under pressure to effect the desired control and the movement of the various control elements of a boiler;

Fig. 2 is a diagrammatic representation similar to Fig. 1 excepting that the apparatus shown in Fig. 2 is particularly adapted for controlling the boiler by hydraulic means;

Fig. 3 is a vertical medial sectional view through a portion of the apparatus shown in Figs. 1 and 2;

Fig. 4 is a sectional view taken in the direction of the arrows along the line 4—4 of Fig. 3. The mechanism shown in detail in Figs. 3 and 4 I prefer to call a constant pressure constant flow controller;

Fig. 5 is a vertical sectional view through a portion of the apparatus shown in Figs. 1 and 2;

Fig. 6 is a sectional view which may be considered as taken in the direction of the arrows substantially along the line 6—6 of Fig. 5. The apparatus shown in Figs. 5 and 6 I prefer to call a variable pressure variable flow controller;

Fig. 7 is a vertical sectional view through a combination reducing and release valve forming a portion of the apparatus shown in Fig. 1;

Fig. 8 is a sectional view taken in the direction of the arrows along the line 8—8 of Fig. 7;

Fig. 9 is a vertical medial sectional view through a power cylinder forming a portion of the apparatus shown in Figs. 1 and 2;

Fig. 10 is a bottom plan view of the mechanism shown in Fig. 9;

Fig. 11 is a vertical medial sectional view through a valve controller forming a portion of the mechanism illustrated in Figs. 1 and 2;

Fig. 12 is a top view of a portion of the apparatus shown in Figs. 1 and 2 with portions thereof broken away;

Fig. 13 is a vertical sectional view taken in the direction of the arrows substantially along the line 13—13 of Fig. 12;

Fig. 14 is a fractional sectional view of the apparatus shown in Fig. 12 taken in the direction of the arrows along the line 14—14 of Fig. 13;

Fig. 15 is a fractional sectional view taken in the direction of the arrows along the line 15—15 of Fig. 13. The device illustrated in Figs. 12 to 15, inclusive, I prefer to call a master controller;

Fig. 16 is a top view of a relay included in the mechanism shown in Figs. 1 and 2;

Fig. 17 is a vertical sectional view taken in the direction of the arrows substantially along the line 17—17 of Fig. 16;

Fig. 18 is a top view of an alternative form of relay included in the mechanism illustrated in Figs. 1 and 2;

Fig. 19 is a vertical sectional view taken in the direction of the arrows substantially along the line 19—19 of Fig. 18;

Fig. 20 is a vertical sectional view through a pressure release valve included in the apparatus illustrated in Figs. 1 and 2;

Fig. 21 is a top view of the mechanism illustrated in Fig. 20;

Fig. 22 is a front view of the mechanism illustrated in Fig. 20;

Fig. 23 is a vertical sectional view taken in the direction of the arrows substantially along the line 23—23 of Fig. 20;

Fig. 24 is a vertical medial sectional view through an alternative form of release valve included in the mechanism illustrated in Figs. 1 and 2;

Fig. 25 is a medial sectional view taken in the direction of the arrows substantially along the line 25—25 of Fig. 24;

Fig. 26 is a top plan view of the mechanism illustrated in section in Figs. 24 and 25; and Figs. 27 and 28 are transverse sectional views taken in the direction of the arrows, respectively along the lines 27—27 and 28—28 of Fig. 6.

In general, combustion control equipment should serve two primary functions. It should adjust the fuel burning rate so as to maintain a constant desired steam pressure and it should adjust the air supply to the fuel burning rate so as to obtain the highest possible efficiency consistent with the fuel and furnace limitations.

The present invention has been illustrated in Figs. 1 and 2 in association with a stoker fed furnace. It will be appreciated, however, that this same equipment can be used for regulating the combustion in liquid, gaseous or pulverized fuel fed furnaces. In fact, proper control of a stoker fed furnace is more difficult than similar control of liquid, gaseous or pulverized fuel fed furnaces, since in the latter furnaces the fuel burning rate varies directly with the fuel feeding rate with very little "flywheel effect." That is, there is very little lag between the time the fuel is fed and the time it burns. In stoker fed furnaces, the rate of combustion varies more immediately with the draft, although the fuel feeding rate must be kept in step with the rate of air supply so as to prevent the quantity of coal in the furnace from building up or decreasing beyond predetermined limits.

In order to insure understanding of the operation of the present device, a detailed description of each of the several control units will be given before a description of the arrangement of the piping for connecting these units with each other and with more or less standard units.

Three more or less fixed pressures are required to operate the system shown in Fig. 1, which is controlled by compressed air throughout; first, the incoming pressure from any pressure producing source which preferably is passed through an automatic pressure regulator before reaching the system so that the pressure on the system is always substantially 60 pounds per square inch. This pressure will be referred to as the regulating pressure. Second, I provide a power unit and relay loading pressure of approximately 30 pounds per square inch. This pressure is supplied through the operation of the combination reducing and release valve shown in Figs. 7 and 8. A third pressure which I have termed the master control pressure of 5 pounds per square inch is obtained through the operation of an automatic pressure reducing valve indicated on Fig. 1 by the numeral 10. This automatic pressure reducing valve can be of any well-known type and no detailed description of this device need be given here, since the construction and operation of such devices is well known. Although in the above I have mentioned pressures of 60 pounds, 30 pounds, and 5 pounds, it will be appreciated that these pressures are given for the purpose of furnishing an example and that other pressures can be used if desired.

The hydraulically controlled system shown in Fig. 2 uses similar pressures which can be obtained in a variety of ways, such as by the use of several elevated tanks filled to a predetermined level so as to place constant hydrostatic heads on pipes connected to these tanks.

Referring to Figs. 7 and 8 of the drawings, it will be seen that the combination reducing and release valve 11 comprises a housing 12 which is shown as being formed as a casting. This casting includes a bracket portion 14 by means of which the device can be secured to a panel or other support means 16 by bolts 18. The casting 12 is provided with a comparatively large recess 20 at its upper end which is covered by a dome-shaped cap 22 secured thereto by a plurality of studs 24. The lower end of the casting is covered by a cup-shaped cap 26 similarly secured to the central casting by studs 28. A cylindrical passage 30 extends from top to bottom through the central casting 12 and connects the recess 20 with the space within the lower cap 26.

Somewhat below its mid-portion, the casting 12 is formed to provide a boss 32 which is drilled and tapped to receive the end of a pipe 34. Air passing to and from this pipe therefore passes to and from cylindrical passage 30. Above the boss 32 the cylindrical passage 30 is fitted with a cylindrical liner 36, the upper end of which is flanged outwardly and secured to the casting 12 by means of countersunk screws 38. The liner 36 therefore forms an integral part of the casting 12 when the device is in use.

A slidable piston 40 is fitted to the interior of the sleeve 36 and is provided at its lower end with a cup washer 42 secured in place by a nut 44 threaded to a stud 46 which in turn is threaded into the lower end of the piston 40. After the stud 46 has been properly located in the end of the piston 40, it is prevented from further movement by drilling a hole 48 transversely through the piston 40 and stud 46 after which a pin 50 is pressed into this hole, thus preventing relative rotation between the stud and piston.

The upper portion of the piston 40 is formed to provide a mushroom type head 52 which rests against the lower surface of a flexible diaphragm 54 secured at its edges between the upper end of the casting 12 and the cap 22. The central portion of the piston 40 is provided with a deep cylindrical recess 56 which extends from immediately beneath the diaphragm 54 to a position well within the piston 40. Since it is possible that air may leak into the space 20 beneath the diaphragm 54, this space is vented to the atmosphere through an opening 58. For a similar reason, a recess 56 within the piston 40 is vented to the space 20 and thus to the atmosphere through an opening 60. Therefore, the space 20 and the recess 56 within the piston 40 are maintained at atmospheric pressure at all times.

A boss 62 extends downwardly from the center of the cap 22 and limits the upward movement of the diaphragm 54. This boss is drilled and tapped from the outside to receive a pipe 64, while the opening into which this pipe is threaded is connected to the space above the diaphragm 54 by a plurality of obliquely downwardly radiating passages 66. Thus, air coming to the device through the pipe 64 will tend to urge the diaphragm 54 and therefore the piston 40 downwardly.

As will be described in greater detail later, the pipe 64 is connected to the previously mentioned pressure regulator 10 so that the upper surface of the diaphragm 54 is always acted upon by a pressure of approximately 5 pounds per square inch. The pipe 34, in a manner to be described in greater detail subsequently, leads to the relays and power units and loads these units with a pressure of 30 pounds per square inch. Thus the pressure acting upon the lower surface of the cup washer 42 may for the moment at least be considered as being 30 pounds per square inch.

The portion of the cylindrical passage 30 below the connection of the pipe 34 contains a sleeve 68 press fitted into place. This sleeve is provided in its external face with two annular grooves, the upper of which is indicated by the numeral 70, while the lower is indicated by the numeral 72. The casting 12 is drilled to provide a passage 74 leading from a position opposite the annular groove 72 to the atmosphere. The groove 72, therefore, comprises an annular passage within casting 70 which is vented to the atmosphere.

The casting 12 is provided with a boss 76 similar to the boss 32 which is located opposite the annular groove 70. This boss is drilled and tapped and a pipe 78 is threaded thereinto. This pipe is connected to the line pressure which has been previously stated as being 60 pounds per square inch and this pressure is in turn communicated to the groove 70. In addition to the previously mentioned annular grooves 70 and 72 formed in the face of the sleeve 68, this sleeve also contains a plurality of vertical passages 80 which lead from the space beneath the cup washer 42 to the space beneath the lower end of the sleeve 68. These two spaces are therefore maintained at the same pressure at all times.

A cylindrical opening 82 extends from end to end through the sleeve 68 in an axial position and contains a piston type slide valve 84 fitted thereto. The lower end of this valve is reduced in diameter to form a pin 86 which seats in a socket in a spring follower 88. This spring follower is supported upon the upper end of a coil spring 90, the lower end of which rests upon a spring base 92 having a socket 94 formed in its lower surface. The spring base 92 is supported upon a pin 96 which has its lower end pressed into a hole in the cap 26, while its upper end is seated in the socket 94. If it is desired to make the spring pressure adjustable, the pin 96 can be replaced by a screw threaded through the cap 26 so that the head of the screw can be turned with a wrench in order to lengthen or shorten the effective portion of the screw which serves as a support for the spring support 92. A spring pressure adjustment screw of this type is indicated by the numeral 276 in Fig. 3.

The upper end of the slide valve 84 bears against the lower end of the stud 46 secured in the piston 40, thus, since the spring 90 always tends to urge the slide valve upwardly, it will be appreciated that this slide valve always follows the movements of the piston 40.

A plurality of passages 98 radiate outwardly from the cylindrical bore 82 to the annular recess 70 while a similar set of passages 99 radiate outwardly from the cylindrical opening 82 to the annular recess 72. Thus both the recesses 70 and 72 communicate with the central cylinder within which the slide valve 84 is fitted. This slide valve is provided with an upper annular groove 102 and a lower annular groove 104. These two grooves are spaced apart a distance slightly greater than the distance between the passages 98 and the passages 99. Thus a downward movement of the slide valve 84 brings the annular recess 102 in line with the passages 98 while an upward movement of the slide valve brings the annular groove 104 into alignment with the radially extending passages 99. To complete the connections, the annular groove 102 is connected to the space beneath the cup washer 42 by a plurality of slots 106 milled or otherwise formed in the body of the slide valve 84. Similar milled slots 108 connect the annular recess 104 with the space at the lower end of the slide valve.

Assuming a pressure of 30 pounds per square inch in the pipe 34, it will be appreciated that this pressure bears against the lower surface of the cup washer 42 and the area of the lower end of the piston 40 is so proportioned with respect to the effective area of the upper surface of the flexible diaphragm 54 that these pressures, together with the pressure exerted by the spring 90, just balance the piston 40 in such a position that the annular recess 102 is out of alignment with the passages 98 while the annular recess 104 is also out of alignment with the radially extending passages 99. Thus, air cannot flow either to or from the pipe 34. Now if because of movement of one of the power units, the pressure in the pipe 34 should rise above 30 pounds per square inch, the force bearing against the lower surface of the cup washer 42 will be greater than the force tending to push the piston 40 downwardly. The piston therefore will move upwardly as will the slide valve 84. This brings the annular recess 104 into alignment with the passages 99, thereby connecting the space beneath the cup washer 42 to the atmosphere by way of passages 80, the space at the lower end of the slide valve, the milled slots 108, the annular recess 104, the radial passages 99, the annular recess 72, and the vent passage 74. Air, therefore, will flow from the pipe 34 until the pressure drops to 30 pounds per square inch, whereupon downward movement of the piston 40 and slide valve 84 will shut off communication between the pipe 34 and the atmosphere. If the pressure in the pipe 34 should drop below 30 pounds per square inch, the piston 40 will move downwardly, thus moving the slide valve 84 downwardly and establishing communication between the annular recess 102 and the radially extending passages 98. Air at 60 pounds per square inch pressure, therefore, flows into the pipe 78 through the annular recess 70, through the radially extending passages 98, around the annular recess 102, and up the milled slots 106 and thence into the pipe 34. This flow will continue until the pressure in the pipe 34 is re-established at 30 pounds per square inch, whereupon upward movement of the piston 40 and slide valve 84 will stop the flow of air into the system which is to be maintained at 30 pounds per square inch.

The master controller illustrated in Figs. 12 to 15, inclusive, and indicated generally by the numeral 100, is responsive to the steam pressure in the boiler header and sends impulses to the variable pressure variable flow controllers to be described subsequently which regulate the furnace draft and rate of fuel supply.

The principal structural element of the master controller is a casting 103 which has a cylindrical recess 105 in its lower face and a sidewise extending trough-shaped housing portion 107. The trough-shaped portion of the casting is provided with a cover 110 secured thereto in any suitable manner; for instance, studs 112 threaded at their lower ends into the casting 103 can extend through holes in the cover and be fitted with nuts 114 which when tightened clamp the cover in place.

At the outer end of the trough the casting is shaped to provide a heavier section 116 which is drilled from beneath vertically to provide a chamber 118 adapted to house parts of a control valve mechanism. The casting is also provided with drilled and tapped mounting pads 120 by means of which the device can be secured to a control panel or to other suitable support. The valve mechanism is illustrated in greater detail in Fig. 15 and comprises a stationary valve member 122 located in the chamber 118 and having a threaded portion 124 which extends through an opening at the upper end of the chamber 118, this threaded portion being provided with a gasket 126 and nut 128 at its upper end by means of which it is tightly clamped in place.

The valve member 122 is drilled axially to permit the passage of a valve stem 130, the upper end of which is threaded to receive a locking pair of knurled nuts 132. The lower surface of the member 122 has a conical valve seat 134 formed therein, which cooperates with the conical valve surface 136 formed upon an enlarged portion at the lower end of the stem 130, so that when the stem 130 moves upwardly, the conical surface 136 of the valve stem will seat tightly in the valve seat 134. This prevents passage of fluid from a pipe 192, around an annular groove 140 formed in the external surface of the valve member 122, and through drilled passages 142 leading from this annular groove to the valve seat 134. When the valve stem 130 moves downwardly, however, fluid will be free to flow from the pipe 192 through the passages mentioned into a chamber 144 beneath the valve seat 134, this chamber being connected to a pipe 194. The lower end of the chamber 144 is closed by a cap 146 held in place by a clamp 148 secured to the casting 103 by a bolt 150. The clamp 148 has a pair of arms 152 which rest against the lower surface of the cap 146 at each side and straddle the central portion, this central portion being drilled to provide a passage 154 which extends axially through the cap.

The inner end of this passage 154 is formed to provide a conical valve seat 156 which cooperates with a conical valve surface 158 formed at the lower end of the valve stem 130. The lower end of the passage 154 is threaded to receive a drain pipe 160 which is normally used only when the system is hydraulically controlled. When the system is pneumatically controlled, the passage 154 ordinarily can be open to the atmosphere.

The distance between the conical valve surfaces 158 and 136 on the stem 130 is so proportioned relative to the distance between the valve seats 134 and 156, that slight upward movement of the valve stem will lift the valve surface 158 from the valve seat 156, thereby establishing communication from the pipe 194 to the drain passage 154, while simultaneously this upward movement of the valve stem will close communication between the pipe 194 and the pipe 192. Downward movement of the valve stem establishes communication between the pipes 192 and 194 while dis-establishing communication between the pipe 194 and the drain. Movement of the valve stem into any intermediate position establishes communication between both pipes and the drain simultaneously.

As will be explained in greater detail presently, the pipe 192 is connected to a source of either air or hydraulic fluid under pressure, in the present instance, five pounds per square inch, while the pipe 194 is connected to two of the controllers and provides a loading pressure varying between zero and five pounds per square inch depending upon the position of the valve stem 130. For instance, downward movement of the valve stem sufficient to seat the valve surface 158 in the seat 156 will permit a flow of air or hydraulic fluid from the pipe 192 to the pipe 194 until a pressure of five pounds per square inch is established in the latter pipe. Likewise upward movement of the valve stem sufficient to seat the valve surface 136 in the seat 134 will dis-establish communication between the pipes 192 and 194, and will permit fluid or air to escape from the pipe 194 through the drain 154 into the pipe 160, or to the air as the case may be, until the pressure within the pipe 194 drops to zero. Any intermediate position of the valve stem will permit fluid to flow from the pipe 192 to the pipe 194 while simultaneously permitting flow from the pipe 194 to the drain. Thus, depending upon the intermediate position of the movable valve member any pressure between zero and five pounds per square inch can be established in the pipe 194.

This valve is operated by a movable scale beam 162 which is connected at its free end to the valve stem 130 while at its opposite end it is pivoted in the sidewalls of the casting. The pivot arrangement comprises a cylindrical rod 164 which extends transversely through the beam 162, it being secured in position therein by means of a set screw 166 threaded into the end of the scale beam and clamped against the bar 164. The ends of this bar project from the sides of the beam 162 and are formed to provide knife edges 168 which bear against the upper portions of annular hardened liners 176 pressed into openings in the sides of the trough-shaped portion of the casting. The outer portions of these openings are closed by caps 178 having set screws 180 threaded through their centers, these set screws being adjusted to determine the end play of the bar 164.

Adjacent its free end the scale beam 162 is formed to provide a gooseneck portion including a re-entrant surface 182 in its upper edge. Directly above this re-entrant portion 182, the free end of a leaf spring 184 has a similar re-entrant surface 186 in its lower face. The opposite end of this leaf spring is hooked over a rod 188 which extends through aligned holes 189 in the sidewalls of the case. At an intermediate point, the leaf spring is urged downwardly by a saddle 190 which rests against the upper surface of the spring and is adjustably moved upwardly or downwardly to a desired position by means of an adjustment screw 193 threaded through a boss in the cover 110, the lower end of this screw projecting into a recess 195 in the upper surface of the saddle 190. A double knife edge 196 is inserted between the re-entrant portions of the leaf spring 184 and the beam 162, so that the tendency of the free end of the spring 184 to move downwardly is transferred to the free end of the scale beam. The free end of the beam therefore tends to move downwardly. By adjusting the screw 193 any desired pressure can be brought to bear upon the free end of the scale beam. If desired, extra holes 189 can be provided, as shown, so as to facilitate the placement of the rod 188 in different positions for use with different length springs 184 having different characteristics.

At its free end the scale beam is welded to an L-shaped piece 197, the free end of which extends outwardly in a horizontal position and has an opening 198 therethrough which embraces the valve stem 130 beneath the nuts 132. Thus upward movement of the free end of the scale beam will raise the valve stem, while downward movement of the scale beam will permit the valve stem to move downwardly under the influence of gravity and of the pressure in the pipe 192 which presses against the upper valve surface 136.

The recess 105 in the lower surface of the casting 103 is fitted with an annular ring 199, while a circular block 200, slightly thinner than the ring 199, is fitted within the opening in the annular ring. The block is sufficiently smaller in diameter than the opening in the ring 199 so that it is free to move upwardly and downwardly without touching the ring. Its purpose is to limit the upward movement of a diaphragm 201 clamped between the lower edge of the ring 199 and the edge of a cap 202 secured in place beneath the ring by studs 203. This cap is drilled and threaded for connection to a pipe 133 which, as will be described more fully presently, is connected to the boiler header. Thus, the direct boiler pressure is brought to bear against the lower surface of the diaphragm 201, thus tending to move this diaphragm upwardly. The block 200 limits this upward movement to a matter of a thirty-second of an inch or so, thus insuring that the elastic limit of the flexible diaphragm will not be exceeded.

Sidewise movement of the block 200, which would bring the edge of the block into contact with the inner surface of the ring 199, is prevented by several small rods 204 which extend radially outwardly from the center of the block 200 through drilled openings therein and through similar openings in the ring 199. The ends of these rods are provided with balls, or the ends are rounded, so that the outer ends of the rods bearing against the inner surface of the recess 105 and the inner ends of these rods adjacent a pin 205, which extends into an opening in the upper surface of the block 200, prevent sidewise movement of this block. The pin 205 is formed as a portion of a hard cup-shaped member 206 which is seated in a recess in the upper surface of the block 200.

Directly above this cup-shaped member 206, the casting 103 has an opening 207 extending therethrough which is located immediately beneath a similar opening 208 extending into the lower surface of the scale beam 162 slightly to the right of the knife edge 168. A pin 209 is located with its upper end in the opening 208, while its lower end extends through the opening 207. This pin has rounded ends which are seated in the cup 206 and a similar cup 210 located at the upper end of the hole 208. Thus, upward movement of the diaphragm 201 causes similar movement of the block 200 and this movement is transferred to the pin 209 and from the pin to the scale beam 162, thus in turn causing upward movement of the free end of the scale beam together with like movement of the valve stem 130.

To prevent the pressure of the spring 184 which is transferred to the scale beam 162 from stressing the diaphragm 201 beyond its elastic limit when pressure in the pipe 132 is low, the pin 209 is provided with a collar 211 located immediately above the bottom of a recess 212 formed in the upper surface of the portion of the casting 103 through which the pin 209 extends. This collar acts as a stop and limits the downward movement of the pin 209.

Although the principal body member, that is, the part 103 has been referred to as a casting, it will be appreciated that this and other parts of the device can be formed in any desired suitable manner and the L-shaped extension 197 can be formed as an integral part of the beam 162 rather than being formed of a separate part welded to the end of the scale beam, if such construction is desired.

The device just described varies the pressure in the pipe 194 from zero to five pounds per square inch, depending upon the boiler pressure exerted upon the device through the pipe 132. The pressure in the pipe 194 thus produced is inverse to the pressure in the pipe 192, that is, as the boiler pressure rises, the pressure in the pipe 194 will drop, while when the pressure in the pipe 192 drops, the pressure in the pipe 194 will rise. As will be explained more fully subsequently, this control pressure in the pipe 194 is adapted to influence the operation of one or more controllers; in the present instance two of these controllers are responsive to this pressure.

In Figs. 3 and 4 is shown what I prefer to call a constant pressure constant flow controller. Although this device may be used for other control purposes, it is used in the system shown in Figs. 1 and 2 to operate a damper in the forced draft air duct. This device is indicated generally by the numeral 220 and is used in conjunction with a release 222 illustrated in greater detail in Figs. 21 to 23 and with a relay 224 illustrated in greater detail in Figs. 16 to 19.

The constant pressure constant flow controller 220 is comprised of a housing 226 which may be formed as a casting and which includes a top wall 234, side walls 228, a bottom wall 230, and a front wall 232. The back of this housing is left open and can be closed by a door if desired, thus making the interior mechanism easily accessible. The top wall 234 of the housing is surrounded by an upstanding ridge 236, thus providing a recess or chamber 238 in the upper surface of the housing. A cover 240 has a depending flange 242 around its periphery which is complementary to the ridge 236, thus when the flange 242 is brought against the ridge 236 and the cover is secured to the casting by means of cap screws 244, the device is provided with an upper closed space. This space is divided into an upper chamber 246 and the previously mentioned chamber 238 by a flexible diaphragm 248 which is placed between the cover and the casting before the cap screws 244 are inserted.

The upper and lower surfaces of the diaphragm 248 are clamped between a pair of complementary mushroom-shaped members 250 which in turn are secured by means of nuts 252 to the upper end of a threaded rod 254. This rod extends downwardly through the upper wall 234 and at the point where it passes therethrough, leakage is prevented by a packing gland or suitable similar expedient 256.

In order to permit easy inspection of the upper chamber 246, the cover 240 is provided with an opening at its center which is closed by a plate 258 secured in place by cap screws 260. Communication is established to the chambers 246 and 238, respectively, by means of pipes 262 and 264 threaded into tapped openings formed in the side walls of the cover 240 and the ridge 236. As shown in Fig. 3, a plurality of these tapped openings are provided, and pipes are shown threaded into four of these openings. These several openings are provided merely as a matter of convenience so that pipes can be attached to the device from either side, but it will be appreciated that in use, ordinarily only one or two pipes will be connected to the device and that others of the openings will be closed by plugs. When only one pipe is connected to the device so as to supply air to one side of the diaphragm 248, while the other side is vented to the atmosphere, at least one of the openings through the side wall of the chamber to be vented to the atmosphere will be left open.

Directly beneath the rod 254, the bottom 230 is provided with an opening closed by a plate 270 secured in place by cap screws 272 and this plate in turn has an upwardly extending threaded boss 274 positioned within the opening. An adjustment screw 276 is threaded through this boss from the outside and at its upper end is provided with a pin 278 which moves upwardly and downwardly as the adjustment screw 276 is rotated. The pin should be substantially in alignment with the rod 254 and at its upper end extends into a socket in a spring keeper 280 which supports the lower end of a coil spring 282. A second spring keeper 284 is seated in the upper end of the spring 282 and is provided with a socket into which the lower end of an upwardly extending rod 286 is fitted.

The upper end of the rod 286 and the lower end of the rod 254 are provided with knife edges which seat in openings provided, respectively, in the lower and upper side of a scale beam 288 so that downward movement of the pin 254 will tend to push the scale beam 288 downwardly while upward movement of the rod 286 similarly will tend to lift the scale beam.

Somewhat to the left of the rods 254 and 286, the scale beam is pivoted by means of anti-friction bearings 290 about a transversely extending shaft 292, the ends of which are anchored in a supporting yoke 294. This yoke is secured rigidly to the left side wall of the case by means of cap screws 296. In general, the yoke extends from its point of attachment inwardly for a short distance and thence downwardly to the bottom of the case where it rests against the bottom wall 230.

The scale beam 288 extends to the left from the point at which it is pivoted to the shaft 292 and at its extreme end is provided with a socket 298 adjacent the side wall of the case. Opposite the socket an adjustment screw 300 is threaded through the side wall of the case, and is provided at its inner end with a conical point 302 which extends into this socket. Thus by turning the screw 300 outwardly and moving the conical point out of the socket 298, the scale beam 288 is allowed considerable freedom of motion, while, when the screw 300 is turned inwardly from this position, the scale beam is allowed less freedom of motion since the edges of the socket 298 impinge against the pin 300 at a point farther up on the conical surface 302.

Between the socket 298 and the cross shaft 292, the scale beam is pivoted by means of a pin 304 to the upper end of a downwardly depending rod 306, the lower end of which is equipped with a dashpot plunger 308. This plunger fits within a cylinder 310 and communication is established between the two sides of the piston through intersecting passages 312, 314, and 316. In order to limit the rate of oil flow through this passage, a needle valve 318 is provided at the point where the vertically extending passage 314 intersects the horizontally extending passage 316. Thus, by adjustment of the needle valve 318, the desired degree of resistance to sudden movement of the scale beam 288 can be established.

To the right of the rods 254 and 286, the scale beam 288 is provided with an extension 320. This extension 320 carries a longitudinally movable weight 322 which can be secured in any desired location by means of a clamp screw 324. After loosening the screw 324, the weight 322 can be moved to the desired position so as to give the scale beam 288 the proper characteristics, after which it is secured in place by tightening the screw 324.

Near its extreme outer end, the extension 320 has a vertical hole 326 therethrough. A flat plate 328 covers the upper end of this hole and is secured in place by a screw 330, while a similar plate 332 covers the lower end of this hole. Thus the outer end of the scale beam extension 320, together with the plates 328 and 332, provide a closed chamber 326. A knife edge 334 is located within this chamber and has a stem 336 depending through an opening in the lower plate 332. The knife edge substantially fills the space from top to bottom and thus downward movement of the right-hand end of the scale beam will press down on the knife edge and move the stem 336 downwardly, while upward movement of the scale beam will lift the knife edge 334, thus raising the stem 336. The stem 336 forms a portion of the release mechanism shown in greater detail in Figs. 20 to 23, where it will be seen that the lower end of the stem 336 is connected to a piston 338 which forms one element of a slide valve.

The piston 338 fits within a cylinder 340 formed within a sleeve 342. This sleeve in turn is fitted within a cylindrical opening 344 in a housing 346. Around its upper portion the sleeve 342 is provided with an enlarged head 348 which fits within an annular enlargement 350 of the cylindrical opening 344. The fit between the sleeve 342 and the cylindrical opening 344 is such that the sleeve 342 slides freely in a vertical direction excepting that its movement in a downward direction is limited when the enlarged head 348 is brought against the bottom of the annular enlargement 350.

A pin 352 extends inwardly through an inclined slot 354 in the side wall of the housing 346 and at its inner end is threaded into the enlarged head 348 of the sleeve 342. Thus, by rotating the pin 352 from side to side, this pin working in the slot 354 will cause the sleeve 342 to be moved upwardly and downwardly.

The side wall of the housing 346 is threaded at 356 to receive the end of a pipe and this threaded opening leads to a passage 358 which extends through the housing and communicates with an annular recess 360 formed around the sleeve 342. This recess in turn communicates with the cylindrical bore 340 through ports 362 at a position opposite the piston 338. Upward movement of the piston 338 will uncover the inner end of the port 362 and connect the port with the space in the cylinder 340 beneath the piston 338, and establish communication between the pipe threaded in the opening 356 and a chamber 364 at the bottom of the cylinder 340. Further, since rotation of the pin 352 causes upward or downward movement of the sleeve 342, this movement raises or lowers the ports 362, and thus raises or lowers the position in which the piston 338 accomplishes its valving action. Since there is no closure at the top of the device, the space in the cylinder 340 above the piston 338 communicates directly with the atmosphere while the space within the cylinder 340 beneath the piston 338 communicates with the chamber 364. This chamber in turn communicates with a pair of threaded openings 366 in the side wall of the housing.

When the above device is used for releasing air pressure, no pipes ordinarily will be connected in the openings 366 and these openings will be vented directly to the atmosphere. If the device is used in a hydraulic circuit, drain pipes will be connected in the openings 366 to return the oil vented by the release to a storage receptacle. Moisture that may collect in the space beneath the head 348 is drained through an obliquely downwardly extending bore 368 that leads from the bottom of the enlarged recess 350 and intersects a vertical bore 370, which leads in turn to the chamber 364. In order to equalize pressures at all points of the apparatus that should normally operate at atmospheric pressures, a pair of bores 372 extend vertically through the sleeve and connect the recess in the upper end of this sleeve with the chamber 364. Also, for the same reason, one or more vents 374 extend through the side wall of the sleeve 342 and connect the recess 350 with the interior of the sleeve 342.

As will be explained more fully subsequently in the description of the operation of the system as a whole, the purpose of release is to vent a conduit connected to the threaded opening 356 whenever the right-hand end 320 of the scale beam 288 moves upwardly under the influence of an increase in pressure in the chamber 238 or a decrease in pressure in the chamber 246.

The release 222 is supported in a position within the constant pressure constant flow controller housing adjacent the right hand wall as seen in Figure 3. A conduit 376 is connected at one end in the opening 356 and extends through the side wall of the housing, and at its opposite end is connected to the previously mentioned relay 224 at the threaded opening 378. This relay is shown in greater detail in Fig. 17.

Since the constant pressure constant flow controller shown in Figs. 3 and 4 should be extremely sensitive to pressure changes, it should be required to do a minimum of work. Thus the device is so arranged that the scale beam of the constant pressure constant flow controller merely moves the small release piston 338. The release in turn controls the flow of a regulating medium in larger quantities through the medium of the relay 224.

This relay comprises a generally rectangular housing 380 which may suitably be formed as a casting. At its upper end the housing is provided with a cylindrical recess 382 which, if desired, may be lined with a sleeve 384. This recess serves as a cylinder which operates in conjunction with a piston 386 normally urged downwardly by a coil spring 388 which bears against the upper end of the piston with one end. The other end of the spring is maintained in place by a spring keeper 390 carried by a cover 392 which closes the upper end of the recess 382. The cover is sealed against the upper end of the sleeve 384 by a gasket 394 and is secured in place by bolts 396. Communication is established with the recess 382 by a pipe 398 threaded into the side wall of the housing in a position opposite an opening 400 extending through the sleeve 384.

The lower end of the device is provided with a similar although smaller recess 402 closed by a cap 404, sealed by a gasket 406 and secured in place by bolts 408. The central portion of this cap 404 is threaded to receive a plug 410 provided with an enlarged hexagonal head 412. By turning the head of this plug, it can be screwed in and out of the cap 404 as desired so as to limit the movement of the piston 386 as will appear presently.

A deep cylindrical recess 414 extends into the plug 412 from its top surface and serves to guide a cylindrical extension 416 formed at the lower end of a cup-shaped spring follower 418. This follower is urged upwardly by a coil spring 420 which bears against this spring keeper at its upper end, while its lower end rests against the cap 404.

The recesses 382 and 402 are connected by a bored opening 422 which contains a valve sleeve 424 press fitted therein. The sleeve 424 in turn is fitted with a piston type slide valve member 426 connected at its upper end to the piston 386, while its lower end rests in the cup 418. The spring 388 tends to move the valve member 426 downwardly, while the similar spring 420 tends to urge this member upwardly. These springs tend to bias the member toward a central position.

The sleeve 424 is provided somewhat above its center with an annular groove 428 which communicates at one side through an opening 430 with a pipe 432. The groove 428 also communicates through several small ports 434 with the valve slide 426.

Somewhat below the annular groove 428 a second similar groove 436 is provided. This groove similarly communicates with a pipe 438 and through ports 440 with the piston 426. A third set of ports 442 extends through the side wall of the sleeve 424 in a position within the recess 402 and communicates eventually with a pipe 444 which is threaded into the recess 402 through the side wall of the housing.

The movable valve slide 426 has a wide annular groove 446 of a width somewhat less than the spacing between the ports 434 and 442. The groove therefore never communicates with both of these ports at the same time. When in its upper position, however, it uncovers the ports 434; while when in its lower position it communicates with the ports 442. Since the ports 440 are located around the mid portion of the groove 446, these ports may be established in communication with the ports 442 by downward movement of the valve slide or with the ports 434 by upward movement of this slide.

The threaded recess 378 into which the pipe 376 is secured communicates with an upwardly extending bore 448 which at its upper end leads into the recess 382 in a position below the piston 386. At an intermediate point, the bore 448 communicates with the annular groove 428 through a radially extending passage 450. A needle valve 452 is secured in the side wall of the housing opposite the passage 450 and thus by adjustment of this needle valve, the flow of fluid through this passage can be regulated as desired. For purposes of convenience, I refer to the needle valve 452 as a choke 452.

The purpose of the relay is to deliver an operating fluid to a power unit which operates one of the boiler controls. Having assumed in the present instance that a line pressure of 60 lbs. per square inch is to be used, the relay serves to supply a line with air at a pressure of 60 lbs. per square inch or less, depending upon the position of the scale beam in the constant pressure constant flow controller. The operation of this device is as follows:

The line carrying air at 60 lbs. per square inch is connected to the pipe 432. This pressure, therefore, is present in the annular groove 428. It also, after passing the needle valve or choke 452, is communicated by the vertical bore 448 with the lower surface of the piston 386 and also through the pipe 376 with the release 222. The pressure of 30 lbs. per square inch available in the system as previously described is connected to the pipe 398 and this pressure therefore always bears against the upper surface of the piston 386. The pipe 438 is connected to the power unit to be served by the relay and the pressure in this pipe varies from zero to 60 lbs. per square inch as will be described presently. If this device is air operated, the pipe 444 may communicate with the atmosphere. If the system is hydraulically operated, this pipe will act as a drain and will return oil to a reservoir.

Air at 60 lbs. per square inch flows inwardly around the groove 428 through the choke 452 and bears against the lower surface of the piston 386. If the release is closed, air will relatively slowly flow around the choke and will build up a pressure of 60 lbs. per square inch in the space beneath the piston 386. Since this pressure is greater than the pressure of 30 lbs. per square inch, tending to urge this piston downwardly, the piston will move upwardly and will carry with it the slide valve 426, thus uncovering the ports 434 and establishing communication between these ports and the centrally located ports 440. Air at 60 lbs. per square inch pressure therefore can flow through the ports 434, along the annular groove 446, through the ports 440, and to the pipe 438, thus gradually building up a pressure in this pipe of 60 lbs. per square inch.

If the release 222 opens, air will be exhausted from the bore 448 faster than it can flow thereinto through the choke 452. Thus the pressure beneath the piston 386 will drop until the pressure of 30 lbs. per square inch present above the piston will urge this piston downwardly. The consequent downward movement of the valve slide 426 will cover the ports 434 and will uncover the ports 442, thus establishing communication from the pipe 438, through the ports 440, along the annular groove 446, through the ports 442, and to the drain pipe 444. The pressure therefore in the pipe 438 will drop until zero pressure is reached, or until the valve slide 426 again moves upwardly. Since the spring 420 is preloaded, a failure of the operating pressure will cause the valve slide 426 to take the intermediate position shown in Fig. 17, thus closing ports 434 and 442, so as to maintain whatever pressure is already established in pipe 438. A pressure failure, therefore, will not upset the boiler operation unless it is of considerable duration.

The device operated by the constant pressure constant flow controller, the release 222, and the relay 224, in the present instance, is a power cylinder 458, illustrated in Fig. 9 of the drawings. This power cylinder is connected by suitable linkage 460, as illustrated in Figs. 1 and 2, with a damper 462 in the forced draft duct 464, through which air passes from a blower 466 to the boiler fire box. Thus, by opening and closing the damper 462, the draft to the fire in the boiler can be regulated.

The power cylinder 458 is comprised of a cylinder 468, provided with an upper end cap 470 and a lower end cap 472. These caps are threaded to the cylinder ends and serve to close the same. Each of these caps is provided with a bracket 474 by means of which the cylinder may be secured rigidly wherever desired. The lower cap 472 is provided with a passage 476 connected to the pipe 438 which, as previously mentioned, is connected at its opposite end to the relay 224. The pressure in this pipe, therefore, varies from zero to 60 lbs. per square inch.

The upper cap 470 is similarly provided with an inlet passage 478 connected to a pipe 480, which in turn is connected to the previously mentioned pressure source which is regulated at 30 lbs. per square inch. The pressure in the upper portion of the cylinder 468 is therefore maintained at 30 lbs. per square inch.

A piston 482 is located within the cylinder 468 and is secured upon a piston rod 484 which extends through a packing gland 486 threaded into the upper cap 470. The piston 482 is normally subjected to pressures of 30 lbs. per square inch, tending to move it downwardly, while the pressure beneath the piston varies from zero to 60 lbs. per square inch, thus causing the piston to be moved upwardly or downwardly, depending upon whether the pressure in the lower portion of the cylinder is above or below 30 lbs. per square inch.

At its upper end the piston rod 484 is threaded into a cross-head 488 provided with an upwardly extending yoke 490, which can be pivotally connected to a movable member 492 by means of a pivot pin 494.

The cross-head 488 is also connected to a pair of downwardly extending rods 496 guided through extensions in the end caps 470 and 472, and which at their lower ends are secured to a second cross-head 498. This second cross-head is also slotted to provide a pair of yoke arms 500 which similarly may be connected to a movable member 502 by means of a pin 504.

Since it may be desired to bias the piston 482 in a downward direction, other than by use of the 30 lb. per square inch air source, provision is made to place a desired number of weights 506 upon the top surface of the yoke 498, these weights being confined by slots in their edges which fit around the rods 496.

The power cylinder 458 is of general application and may be used for a variety of purposes. In the present instance wherein it is used to control the damper 462, the movable member 502 may be considered as the upper portion of the link 460 previously mentioned. In this application the weights 506 are not used, since the piston 482 is biased in a downwardly direction by the 30 lbs. per square inch air source; also the movable member 492, described as being connectible to the upper cross-head 488, is not used, since this power cylinder is used to move the damper 462 only.

In general, the cylinder 458 is adaptable for use wherever it is desired to move a mechanical linkage arrangement by means of variable pressures provided in the present system. As shown, such a linkage can be connected either at the upper end or lower end, whichever is the more convenient.

In some instances, it is desired to use the variable pressures provided in the present system for controlling a steam valve rather than for moving a mechanical linkage. An arrangement for accomplishing this is shown in Figure 11 and will be referred to as a valve controller 508. In the system, as will be described more fully subsequently, the valve controller 508 is provided for controlling the rate of steam flow to a stoker motor which feeds fuel to the boiler at a rate depending upon the steam flow thereto. That is, the more steam fed to the stoker motor, the greater the quantity of fuel fed to the boiler in any given time.

The valve controller is comprised of a housing 510 provided at its lower end with a recess 512 which serves as a cylinder adapted to cooperate with a piston 514 located therein. The lower end of this cylinder is closed by a cap 415 and is connected to a pipe 516 which supplies variable pressure fluid for moving the piston 514, while the upper end of the cylinder is connected to an exhaust pipe 518. If the system is air operated, this pipe will normally lead to the atmosphere, while if the system is hydraulically operated, this pipe usually will be connected to the oil reservoir.

The piston 514 operates against the lower end of a reciprocable piston rod 520, the opposite end of which supports the lower end of a slidable valve member 522. This valve member is normally urged downwardly by a coil spring 524, the upper end of which bears against the inner surface of a cap 526. The tendency of the valve slide 522, therefore, is to remain in its lowermost position until the force tending to move the piston 514 upwardly is sufficient to overcome the pressure developed by the spring 524. After such a pressure has been developed, any increase in the pressure in the pipe 516 will increase the amount of upward movement of the valve slide 522 approximately proportionally.

The valve member 522 reciprocates in a valve housing 528, one side of which is connected to a pipe 530, connected at its other end to the boiler steam line. The opposite side of the housing communicates with a pipe 532 leading to the stoker motor 534. Within the valve housing the space is divided by a horizontal partition 536 through which the valve slide 522 passes. When the valve slide 522 is in its downward position, communication between the pipes 530 and 532 is closed off, while when the valve slide moves upwardly, communication between these two pipes is established through a plurality of vertical slots 538 cut into the side wall of the slide in a position just below an enlarged head 540 formed at the upper end of the valve member. This head has a tapered surface which seats in the upper surface of a bushing 542 threaded through the partition 536 when the valve slide is in its downward position, thus limiting downward movement of the slide.

In Figs. 5, 6, 27, and 28 I have illustrated what I refer to as a variable pressure variable flow controller. In the arrangement shown in Figs. 1 and 2, two of these variable pressure variable flow controllers are used. One of these regulates the rate of steam flow to the stoker motor and is indicated by the numeral 544. The other regulates a damper in the smoke flue and thus, when operating together with the previously mentioned damper 462, serves to regulate the pressure in the boiler fire box. This latter variable pressure variable flow controller is indicated by the numeral 546.

As illustrated in Figs. 1 and 2, the variable pressure variable flow controller 546 is the reverse complement of the similar controller 544, which is illustrated in greater detail in Figs. 5, 6, 27 and 28. The principal reason for showing the controller 546 as the reverse complement of the controller 544 is that it better illustrates the connections made to these controllers. One practical advantage in providing controllers of both types is that, when desired, the two control knobs for regulating these controllers can be placed close together in side by side relation. It will be appreciated that two controllers 544 can be used, if desired, in place of the two different types shown. However, since the controller 546 is the reverse complement of the controller 544, no separate description need be given for the controller 546.

The controller 544 is adapted to operate a release and a relay in much the same manner as these elements are operated by the constant pressure constant flow controller 220 previously described. However, instead of weighing one pressure against another in the manner accomplished by the controller 220, the variable pressure variable flow controller proportions three separate pressures and the movement of the scale beam is determined by the manner in which these three separate pressures act upon the scale beam. The apparatus also includes an arrangement such that the relative effects of the several pressures upon the scale beam can be varied at will.

The controller 544 is comprised of a housing 548, which may be formed as a casting in the shape of a generally rectangular box, having a top wall 550, a front wall 552, side walls 554, and a bottom wall 556. The bottom wall 556 has a re-entrant face therein to provide a chamber 558. This chamber is closed by a bottom cap 560 having a similar reentrant face, thus providing a chamber 562. Before the cap 560 is secured to the bottom of the housing, a flexible diaphragm 564, clamped at its center between a pair of mushroom shape members 566, is so located that it is clamped at its edges between the bottom of the housing and the edge of the cap 560 when the cap is secured in place by means of bolts 568.

The two mushroom shaped members 566 are secured to an upwardly extending rod 570, which passes through a suitable packing gland 572 in the bottom of the case. A short distance above the gland 572 this rod is pivoted by means of a transverse extending pin 574 to a bar 576.

The bar 576 is located within the case in a generally horizontal position. Somewhat to the left of the pivot pin 574, as seen in Fig. 6, it is pivoted in anti-friction bearings 578 secured in the arms of a yoke 580. The yoke in turn is secured to the inner surface of the bottom of the case by means of cap screws 582. This yoke has a pair of vertically upstanding arms 584, which rise to a point near the top of the case and then extend toward the left-hand wall, as seen in Fig. 6, where they are clamped against the wall by cap screws 586, thus providing a rigid structure.

The upper chamber 558 has threaded connections 588 at either side so as to facilitate the attachment of a pipe at either side of the case. The opening not used will ordinarily be sealed by a threaded plug, not shown. The bottom chamber 562 is similarly provided with threaded openings 590 at each side to which conduits can be connected. In this description the pressure acting within the chamber 562 against the lower side of the diaphragm 564 will be known as the minor pressure, whereas the pressure acting in the chamber 558 against the upper side of the diaphragm will be known as the major pressure; that is, ordinarily, if two pressures are to be balanced one against the other, the higher of these two pressures will be communicated to the chamber 558, while the lower chamber 562 receives the lower pressure.

From the above, it will be seen that the two pressures acting against the diaphragm 564 will tend to move the rod 570 downwardly to a greater or less extent, depending upon the ratio of the major pressure to the minor pressure. It follows, therefore, that the tendency of the rod 570 to move downwardly will be communicated to the bar 576, thus causing the bar to pivot in the bearings 578.

At a distance considerably above the bar 576, a second similar bar 592 is provided and is pivoted in anti-friction bearings 594 mounted in the upstanding arms 584 of the yoke 580. This second bar 592, for convenience in description, will be referred to as the scale beam 592. As shown in Fig. 6, the left-hand end of the scale beam 592 is located adjacent the case wall. A limit adjustment screw 596 is threaded through the case at this point and is provided with a conical point which extends into a socket 598 in the end of the beam 592. By turning the limit screw 596 inwardly or outwardly, limitations on the movement of the scale beam 592 can be established in the same manner that the adjustment screw 300 limits the movement of the beam 288 of the device shown in Fig. 3.

Near its left-hand end, the beam 592 is pivotally connected to the upper end of a dash pot plunger 600 which works in a dash pot cylinder 602 and prevents sudden movements of the scale beam 592 in the same manner as the previously described dash pot controls the movements of the scale beam of the device shown in Fig. 3. It, therefore, needs no additional description here.

The top of the case is provided with an opening 604 covered by a dome-shaped cap 606, having a threaded opening 608 therethrough which, in the present instance, is connected to a pipe line 194, attached at its other end to the previously mentioned master controller. As previously described, this master controller supplies a regulating fluid at a pressure of from zero to 5 lbs. per square inch, depending upon the boiler pressure.

A flexible diaphragm 610 is secured between the cap 606 and the top of the case. At its center this diaphragm is clamped between a pair of mushroom shaped washers 612 secured to a downwardly extending rod 614. The lower end of this rod has a knife edge which is seated in a socket 616 provided in the upper surface of the scale beam 592 at a position somewhat to the right of the point about which the scale beam 592 pivots. In a position still farther to the right, the scale beam is attached by means of knurled nuts 618 to a rod or stem 620 which extends downwardly into a release 622.

Somewhat to the left of the point about which the bar 576 pivots, this bar is fixed to a pair of parallel upstanding rods 624. These rods extend upwardly to a position slightly below the scale beam 592 and are positioned at right angles to the bar 576. Approximately the same distance to the right of the point about which the bar 576 pivots, another set of similar rods 626 extend upwardly parallel to the first set. The four rods 624 and 626 thus are arranged at the corners of a rectangle as may best be seen in Fig. 28. A similar set of rods 628 extend downwardly from the scale beam 592 in a position vertical thereto and are arranged so that when the beam 592 is substantially parallel to the bar 576, one of these rods 628 will lie midway between the two rods 626, while the other of the rods 628 will lie midway between the rods 624. That is, when the beam 592 is approximately parallel to the bar 576, all six of these rods will be parallel to each other and will be approximately vertical.

A yoke 630, shown in section in Fig. 27, is attached at its upper end to a thin flexible metal strip 632 and is suspended by this strip in a position centrally located between the bars 624, 626 and 628. The upper end of the strip 632 is wrapped around a drum 634 and is secured thereto by a screw 636. This drum is mounted upon a transversely extending shaft 638 which is journalled in the upper portion of the upstanding members 584 of the yoke 580. At each side of these upstanding members the shaft has a collar 640 secured thereto, which retains the outward end of a coil spring 642, the inner end of which bears against a spring keeper 644. These keepers in turn press brake washers 646 against the outer faces of the upstanding members 584. These brake washers can be made of any suitable material having a comparatively high coefficient of friction such that the rod 638 can be turned, but under restraint, by means of a knob 648 attached to the outer end of the shaft 638. This knob is shown in Figs. 1 and 2 of the drawings. Thus, by rotation of this knob the yoke 630 can be raised or lowered in its position among the several rods 624, 626 and 628.

The yoke 630 has a transversely extending pin 650, which carries a pair of rollers 652 at its ends. One of these rollers fits closely between one of the rods 626 and the adjacent rod 624, while the other roller similarly fits between the other rod 626 and its adjacent rod 624. These two rollers 652 are located on the outer faces of the yoke 630. Centrally located within the yoke is another roller 654 which fits between the two rods 628. This latter roller 654 is preferably grooved so as to prevent sidewise movement of the rollers and yoke.

When the diaphragm 564 flexes upwardly, thereby lifting the outer end of the bar 576, this movement of the bar rocks the upper ends of the rods 624 and 626 toward the left-hand side of the case, as shown in Fig. 6. The rods in turn move the rollers 652 toward the left-hand side of the case and thus, acting through the roller 654 which moves therewith, this motion is communicated to the rods 628 secured to the scale beam 592. The right-hand end of the scale beam 592 is therefore moved downwardly.

This arrangement causes any force tending to move the lower bar 576 to be communicated to the scale beam 592, and further, the vertical position of the yoke 630 determines the relative effect upon the beam 592 of the pressure within the dome 606 on the one hand, and the pressures acting upon the diaphragm 564 on the other hand. That is, if the yoke 630 is lowered, the resultant force acting upon the diaphragm 564 will be relatively increased, while if the yoke 630 is raised, the effect of the resultant pressure upon the diaphragm 564 will be less upon beam 592, as compared to the effect upon this beam of the pressure in the dome 606.

Although any suitable arrangement can be used for securing the dash pot 602 and the release 622 in position within the case 548, the arrangement shown which is satisfactory, consists in passing a pair of parallel horizontally positioned rods 633 through the case from side to side through openings formed in the castings which comprises the dashpot cylinder 602, and through the casting which comprises a housing for the release 622. If desired, these rods can also pass through similar opendings formed through ears 635, which comprise portions of the side members 584 of the yoke 580, thus giving added rigidity to the device as a whole. Another dashpot mounting arrangement, which I sometimes use, is to secure the dashpot to the bar 576 in a position directly beneath the one shown. With this arrangement, both the dashpot and plunger move, and the weight of the dashpot helps balance the pivoted bar 576.

The release 622 is shown in detail in Figs. 24, 25, and 26, and is adapted to release a control fluid from a pipe connection 637 when the stem 620 moves downwardly, and to release a control fluid from a separate pipe 639 when the stem 620 is moved upwardly. The device is comprised of a housing 641 which may be formed as a casting and which is essentially an open topped rectangular box. At its lower end, the housing is provided with a threaded opening 643, to which a drain pipe may be connected to return released hydraulic fluid to a storage receptacle if the system is hydraulically operated. If the system is air operated, the drain pipe can be omitted, if desired, and the compressed air can be released directly to the atmosphere. Within the housing 641 the device includes an upper valve block 645 and a lower valve block 647. Each of these blocks is formed to provide a deep recess 649 therein, having a valve seat 651 adjacent the opposite side of the block. These blocks can be made alike and then secured together by bolts 653 with the recesses 649 in alignment and facing each other. Before these blocks are so secured, a valve ball 655 is placed in each of the seats 651 and each of these balls is urged into its seat by a spring 656. The opposite ends of these springs bear against a partition 658 which lies between the blocks and isolates one of the chambers 649 from the other.

The upper of the chambers 649 is connected to a pipe 660 which extends through the side wall of the housing and is attached at its other end to the pipe fitting 637. Similarly the lower chamber 649 is connected by a pipe 662 to the fitting 639.

The lower end of the stem 620 is secured to a yoke 664 which extends around the sides of the blocks 647 and 643 and is guided through openings 666 formed in extensions of the partition 658. The lower end of this yoke is provided with a cross piece 668. The lower end of the stem 620 projects through the upper cross member 670 of the yoke and into a position directly above the upper ball 655, while the lower cross member 668 is provided near its center with a pin 672, which extends upwardly therethrough into a position directly below the lower ball 655. Thus, when the yoke moves downwardly, the lower end of the stem 620 presses the upper ball 655 downwardly, thereby exhausting the control fluid from the chamber 649 and a pipe connected to the fitting 637. Similarly, upward movement of the yoke lifts the lower ball 655, thereby releasing the control fluid from a pipe connected to the fitting 639.

The upper fitting 637 is connected to a conduit 674, which in turn is connected to a relay 676 secured to the outer face of the variable pressure variable flow controller housing. Similarly, the lower pipe fitting 639 is connected to a conduit 678, which at its other end establishes communication with the relay 676 at another point.

This relay is shown in greater detail in Figs. 18 and 19, wherein it will be seen that, in general, it is similar to the previously described relay illustrated in Fig. 17. It is comprised of a housing 680, having a lower chamber 682 therein, closed by a cap 684. Within this chamber a preloaded coil spring 686 urges a spring follower 688 upwardly and this follower in turn biases a valve slide 690 in an upwardly direction.

The valve slide 690 operates in a sleeve 692, having an upper set of ports 694 communicating with the pipe 696, a middle set of ports 698 communicating with the pipe 700, and a lower set of ports 702 that communicate with the recess 682, and thence to a drain pipe 704. The central portion of the valve slide 690 is formed to provide an annular groove 706 which extends vertically a distance somewhat less than the spacing between the ports 694 and 702.

At its upper end the valve slide 690 carries a piston 708 which operates in a cylinder 710 located in the upper portion of the housing. This piston 708 is urged in a downwardly direction by a preloaded coil spring 712 located within the chamber 710 and which bears with its upper end against a cap 714.

All of the previously described elements of the relay 676 are essentially similar to the similar parts of the relay 224. They therefore need no additional detailed description here.

A pipe 716, which carries regulated air or other operating fluid at 30 lbs. per square inch, is connected to a block 718 attached to the relay housing. A passage 720 extends through the block and communicates with the upper portion of the chamber 710. Another similar passage 722 in the block establishes communication from the pipe 716 to the lower portion of the chamber 710. The upper of these passages is provided with an adjustable needle valve 724 which regulates the flow of fluid therethrough, while a similar needle valve 726 in the passage 722 regulates the flow of fluid to the space beneath the piston 708.

At the opposite side of the device, the upper portion of the chamber 710 is connected to the previously mentioned pipe 674 which leads to the release, while the similar pipe 678, also connected to the release, communicates with the lower portion of the recess 710 in a position beneath the piston 708. The pipe 696 is connected to the fluid source regulated at 60 lbs. per square inch. The pipe 704, as previously mentioned, is connected to the drain, or to the atmosphere if air is used, while the pipe 700 is connected to the power cylinder or valve control as the case may be.

The operation of this device is as follows: When the release 622 is in balance, both balls 655 will be in their seats and thus, fluid cannot flow from either of the pipes 674 or 678. Since fluid at 30 lbs. per square inch flows into the device around both of the needle valves 724 and 726, the pressure both above and below the piston 708 will eventually be established at 30 lbs. per square inch. Under these conditions, the piston 708, operating under the influence of the two springs 712 and 686, will take an intermediate position, as will the valve slide 690. This may be considered as the attitude shown in Fig. 19. In this attitude the ports 694, leading to the pipe 696, and the exhaust ports 702, are both cut off.

Now if the stem 620 of the release moves downwardly, thus moving the upper ball 655 away from its seat, the control fluid will flow from the chamber 710 through the pipe 674 more rapidly than this fluid can be replaced through the needle valve 724. The pressure above the piston 708 therefore drops, and the piston and the valve slide 690 move upwardly. This movement of the valve slide uncovers the port 694 and establishes communication between the pipes 696 and 700. Fluid therefore flows from the pipe 696 to the pipe 700, thereby building up a pressure in this latter pipe which leads to the power cylinder, or alternatively to the valve control cylinder. This in turn causes the piston in the appropriate cylinder to be moved in one direction.

When the conditions are such that the stem 620 of the release 622 moves upwardly, the lower ball 655 will be raised from its seat, thereby permitting fluid to flow from a position beneath the piston 708 more rapidly than it can be replaced around the needle valve 726, thereby causing the piston 708 and valve slide 690 to move downwardly. This closes the ports 694 and opens the ports 702, thereby permitting fluid to flow from the pipe 700 to the drain. The pressure in the pipe 700 leading to the power cylinder or valve control cylinder therefore drops and the piston in this cylinder moves in the opposite direction.

In Fig. 1 of the drawings I have shown what may be considered a typical installation of the combustion control equipment embodying the present invention. In this view of the drawings, compressed air is used as a regulating medium, the boiler is stoker fed and receives its air through a forced draft duct, indicated by the numeral 464.

Toward the left-hand side of this figure the boiler is illustrated somewhat diagrammatically and is indicated by the numeral 730. Essentially it comprises a fire box 732 and a plurality of boiler tubes which in the interest of clarity of illustration have not been indicated. These tubes, however, are connected between several headers indicated by the numeral 734. One of these upper headers is connected to a main steam line 736 through which all of the steam from the boiler may be considered as passing.

Near the upper portion of the boiler the exhaust gases pass outwardly around a damper 738 to a stack 740. The fuel, which in the present instance is coal, is fed into the fire box from its right-hand side by means of a stoker previously mentioned and indicated by the numeral 534.

The stoker 534 is driven by an engine supplied with steam through a pipe 532, the pipe being connected to a valve controller of the type previously described and indicated by the numeral 508. The inlet side of the valve controller is connected by means of a pipe 530 to the steam line 736, and thus when the piston 514 in the valve controller is raised, steam can flow from the steam line 736 to the engine which drives the stoker 534.

A pulley 744 rotates with the stoker and is connected by a belt 746 to a small blower 748. This blower is connected on its outlet side by a conduit 750 to the variable pressure variable flow controller 544. The pressure supplied by this blower is relatively low and varies substantially directly with the stoker speed. The pressure is communicated to the controller 544 at the opening to which the pipe 588 is shown as connected in Figs. 5 and 6. Since the blower is connected to the upper controller chamber, the pressure supplied by this blower will be referred to hereafter as the major pressure.

The minor pressure chamber of the controller 544 is connected by its outlet pipe 590 to the atmosphere through a pipe 752. Although in Fig. 1 of the drawings the pipe 752 is connected to several instruments and is shown as being vented to the atmosphere at only one point, it will be appreciated that if desired, all of the instruments can be vented directly to the atmosphere when air is used as a control medium, in which case no pipe 752 is necessary.

With the above mentioned connections established, the minor pressure chamber of the controller 544 will be maintained at atmospheric pressure, while the pressure in the major pressure chamber of the controller 544 will be at substantially atmospheric pressure when the stoker is idle, but will rise considerably above atmospheric pressure when the stoker operates. In general, the degree of pressure rise in the major pressure chamber will depend upon the stoker speed and will be substantially proportional thereto.

Air is supplied to the fire box by means of the previously mentioned blower 466 through a conduit 464 and the flow through this conduit is regulated by a damper 462. This damper is moved by means of a bell crank and link 460 attached to the lower end of a power cylinder which may be of the type illustrated in Fig. 9 and indicated generally by the numeral 458. The linkage arrangement is such that when the piston 482 of the power cylinder moves upwardly, the damper 462 will be opened.

A third boiler regulating means is comprised of the damper 738 in the outlet flue. This damper is connected by a bell crank and link 754 to the upper end of a power cylinder 458a of the type illustrated in Fig. 9. With this arrangement the damper 738 is opened when the piston of the power cylinder 458a moves upwardly. When no operating pressure is supplied to this cylinder, the piston therein is maintained in its lowermost position with the damper 738 closed, by means of a plurality of weights 506 arranged in the manner described in connection with the detailed description of the power cylinder 458.

The instrument which controls the operation of the power cylinder 458a is the variable pressure variable flow controller 546. The major pressure side of this controller is connected by means of a pipe 756 to the space within the upper portion of the boiler on the inlet side thereof, while the minor pressure chamber of the controller 546 is connected by a conduit 758 to the space within the boiler near the outlet side thereof, these two connections being separated by baffles 760. It will be appreciated that the spread between the two pressures thus attained can be altered by regulating the damper 738 in conjunction with the damper 462.

The valve controller 508 which regulates the steam flow to the stoker is controlled by the constant pressure constant flow controller 220 which has its upper chamber 246 vented to the atmosphere, while the lower chamber 238 is connected by a pipe 264 to the space within the boiler in a position adjacent the similar opening of the pipe 756.

Each of the variable pressure variable flow controllers 546 and 544 have their upper chambers connected to a pipe 194 which has been previously described as being connected at its other end to the master controller 100. As has been brought out in the detailed description of the master controller 100, its lower connection, that is the pipe 132, communicates with the main steam line of the boiler, while its upper connection, the pipe 192, carries air at 5 lbs. per square inch pressure supplied from the pressure regulator 10. The pressure acting downwardly upon the upper diaphragms of the controllers 544 and 546, therefore, varies from zero to 5 lbs. per square inch depending upon the pressure in the main steam line 736.

Regulated air at 60 lbs. per square inch pressure is brought into the system through a pipe 762 which connects to the inlet side of the pressure regulator 10 and to the inlet side of the combination reducing and release valve 11. The pressure regulator 10 supplies air at 5 lbs. per square inch pressure to the pipe 192 which connects to the master controller 100 and to the pipe 64 of the combination reducing and release valve. This pressure is also indicated on a gauge 764. The combination reducing and release valve 11 supplies air at a loading pressure of approximately 30 lbs. per square inch to a pipe 34. This pressure is indicated on the gauge 766. The regulated source pressure of 60 lbs. per square inch connected to the system, and the boiler pressure are indicated, respectively, on gauges 768 and 770.

The pipe 752 which is maintained at atmospheric pressure and which serves to vent the several instruments is connected to the following vent openings: the threaded connection 366 of the release 222, the pipe 444 of the relay 224, the drain pipe 704 of the relay 676, the threaded opening 643 of the release 622, the similar drain openings of the similar release and relay operated by the controller 546, and the outlet pipe 518 of the valve controller 508.

In addition to those instruments previously mentioned, the pipe line 762 supplies air at 60 lbs. per square inch pressure to the pipe 696 of the relay 676, a similar pipe 696a connected to the similar opening of the relay 676a operated by the controller 546, and the pipe 432 of the relay 224 operated by the controller 220.

The pipe line 34 controlled at 30 lbs. per square inch pressure by the combination reducing and release valve 11 supplies air at this pressure to the pipe 716 connected to the relay 676 and through a similar pipe to the similar connection of the relay 676a. This pressure is also communicated through a pipe 398 to the relay 224 and through a pipe 480 to the upper end of the power cylinder 458.

The pipe lines which carry the operating pressures, which vary from zero to 60 lbs. per square inch, include a pipe 700 leading from the relay 676 to the pipe 516, connected at the lower end of the valve controller 508. A similar line 700a leads from the relay 676a to the lower end of the power cylinder 458a, while the lower end of the other power cylinder 458 is connected by a pipe 438 to the relay 224.

The arrangement shown in Fig. 2 of the drawings is similar to that shown in Fig. 1, excepting that it is operated hydraulically rather than by means of air pressure. For this reason the drain pipe 752 returns fluid to a reservoir 722 rather than exhausting this fluid to the atmosphere.

One means for obtaining the hydraulic pressures for operating this system without the use of the reducing valve 10 and the combination reducing and release valve 11 consists in providing a pump 774 of any suitable type connected on its inlet side by a pipe 776 to the reservoir 772. An outlet pipe 778 leads from the pump 774 to a tank 780 placed at a sufficient height above the controller so that the hydrostatic head will be approximately 60 lbs. per square inch. This can be accomplished by pumping the liquid into the tank 780 and regulating the liquid level therein by means of an overflow drain pipe 782. This drain pipe passes overflowing liquid into a lower tank 784 which has an overflow pipe 786 therein so placed that it regulates the level within the tank 784 at such a level that the hydrostatic head at the controllers is approximately 30 lbs. per square inch. The fluid which overflows through the pipe 786 passes into a third tank 788 which has an overflow pipe 790 therein so placed that it maintains a head of 5 lbs. per square inch at the master controller 100. The overflow pipe 790 returns liquid to the reservoir 772. The pipe 762 is connected to the tank 780 while the pipes 34 and 192 are connected, respectively, to the tanks 786 and 788.

Other expedients can, of course, be used to obtain the pressures necessary for operating the present system. For instance, a two-stage centrifugal pump could be used to obtain the pressure of 60 lbs. per square inch, while a tap could be arranged to take off fluid from the first stage at 30 lbs. per square inch. However, the arrangement shown and described is comparatively simple and is effective for maintaining the desired pressures in the pipes 34, 762 and 192.

The description of the operation of the system shown in Fig. 1 will serve as a description of the system shown in Fig. 2 since their operation is similar.

For the purpose of explaining the operation of the system shown in Fig. 1, it will be assumed that the boiler is to maintain a pressure of 200 lbs. per square inch regardless of the load, and that from time to time this load will vary. To start with, it is assumed that the boiler is operating properly, that is, the fuel and air mixture and the pressure within the boiler fire box and around the boiler tubes are all properly adjusted to give efficient burning as measured by the carbon-dioxide content in the flue gases. It is assumed further that air and fuel are being fed to the fire box at a proper rate to maintain a steam pressure of 200 lbs. per square inch under whatever load conditions currently prevail. Under these conditions the system is in the balance.

If now it is assumed that the steam pressure drops slightly from 200 lbs. per square inch, because of an increase in the load or for any other reason, this dropping pressure will affect the master controller 100 so that in the manner previously described, the pressure in the pipe 194 rises slightly. This in turn causes an increase in pressure upon the upper surface of the diaphragms 610 in the controllers 544 and 546. Therefore, inasmuch as the pressures upon the lower diaphragms 564 of these controllers remain constant, the scale beams 592 will move downwardly, thus lowering the stems 620 in the releases located within these controllers. This in the manner previously described causes the valves in the relays 676 and 676a to move upwardly inasmuch as control fluid is being vented from the pipes 674 connected to the spaces above the pistons in these relays.

The upward movement of the valves in the relays uncovers the ports 694 and connects the pipes 700 and 700a to pipes 696 and 696a, thereby increasing the pressure beneath the piston in the power cylinder 458a and the pressure beneath the piston in the valve controller 508. The increase in pressure in the line 700 urges the slide vavle 522 in the valve controller upwardly, thus increasing the rate of steam flow to the stoker engine. Simultaneously, the piston in the power cylinder 458a moves upwardly so as to increase the rate of flow of the flue gases around the damper 738, thus increasing the air flow through the boiler.

Since the stoker motor runs faster, the reactance blower 748 also operates more rapidly, thereby increasing the pressure in the line 750, which in turn increases the pressure in the major pressure chamber of the variable pressure variable flow controller 544. The effect, therefore, is to tend to move the outer end of the bar 576 of the controller 544 downwardly. This effect in turn is communicated to the scale beam and tends to raise the latter toward its original position, thereby decreasing the rate of flow of steam to the stoker motor if the stoker motor should tend to run too rapidly.

A similar reactance is established for the damper 738 by the pipes 758 and 756 connected, respectively, to the minor pressure chamber and the major pressure chamber of the controller 546. Thus, opening of the damper 738 increases the pressure differential in the major and minor pressure chambers, thereby urging the diaphragm 564 downwardly. In other words, the reactance established for the damper 738 prevents this damper from completely opening, while the similar reactance established for the stoker motor prevents the stoker from running too fast. Further, the balance established between the impulses sent by the master controller 100 and the reactances continually keep the damper 738 and the valve controller 508 properly adjusted.

The partial opening of the damper 738 will bring about a decrease in the pressure within the boiler fire box and consequently at the opening at the end of the pipe 264. This in turn decreases the pressure beneath the diaphragm 248, thereby urging the scale beam 288 of the constant pressure constant flow controller 220 downwardly. The lowering of the scale beam 288 lowers the valve slide in the release 222, thereby closing the vents 362 to the atmosphere.

By referring to Figure 17, it will be seen that closing these vents causes an increase in the pressure beneath the piston 386, which in turn urges the valve slide 426 upwardly, thus connecting the pipe 438 to the pipe 432, which in turn increases the pressure beneath the piston in the power cylinder 458. The piston in this cylinder therefore moves upwardly and causes the link 460 to rotate the damper 462 toward opened position so as to increase the rate of air flow through the duct 464. This ultimately results in a raising of the pressure within the fire box and around the boiler tubes and reestablishes the air fuel ratio, which in turn increases the pressure at the inlet opening of the pipe 264, thereby preventing the damper 462 from being opened more than is desirable.

From the above description of how the system operates upon a decrease in the steam pressure, it will be apparent that the system operates in a substantially reverse manner if the steam pressure should increase, and no detailed description of the operation of the system under such a condition is necessary to an understanding of the present invention.

It will be seen that the systems shown in Figs. 1 and 2 accomplish a full control over a steam boiler with a minimum of equipment expense.

It is apparent also that the controllers 220, 546, 544 and 100 can be mounted upon a panel and may be located in a position remote from the power cylinders and valve controllers.

Atmospheric changes or a change in the composition of the fuel or both will disturb the efficiency of the boiler, and when such changes take place, they can be detected by a carbon dioxide meter of any suitable type. Such changes indicate that the system should be rebalanced so as to change the ratio of fuel to air fed to the boiler. These changes are accomplished by adjusting the ratio control knobs 648 of the variable pressure variable flow controllers 544 and 546 and, if necessary, by adjusting the control screw 276 of the constant pressure constant flow controller 220. For instance, if more fuel is needed, this additional fuel can be supplied by rotating the knob 648 of the controller 544 in such a direction that the yoke 630 is raised. This causes the pressure acting upon the upper surface of the diaphragm 610 to have a greater effect upon the release 622 than the major pressure acting against the lower surface of the diaphragm 564. Thus the stoker will operate at a higher speed before the blower 748 develops sufficient pressure to bring the scale beam 592 into a balanced position.

Similarly if the ratio of air to fuel becomes too high, the air flow can be reduced by rotating the control knob 648 of the controller 546 in such a direction as to lower the yoke 630 of the controller 546. The lowering of this yoke enables the pressure acting upon the lower diaphragm 564 to have an increased influence upon the scale beam. Therefore, the pressure differential between the pipes 756 and 758 exerts more influence upon the controller 546 than does the pressure in the pipe 194.

If it is desired to maintain a pressure either higher or lower than 200 lbs. per square inch, this is accomplished by regulating the master controller 100 by turning the adjustment screw 193 thereof so as to increase or decrease the compression of the springs 184. If it is desired to increase or decrease the furnace pressure, this can be accomplished by adjusting the screw 276 of the controller 220, or for slight changes, by rotating the pin 352 of the release 222.

Although the piston in the power cylinder 458 is shown as being urged downwardly by a pressure of 30 lbs. per square inch in the line 78, this connection can be omitted if desired, and the piston can be biased in a downward direction by means of weights 506 similar to those used with the power cylinder 458a. Likewise, if desired, the weights 506 can be omitted from the power cylinder 458a, in which case the pipe 34 is connected to the upper end of this cylinder. Similarly also, the pipe 34 can be connected to the valve controller 508 at the point where the pipe 518 is shown as being connected in Fig. 11, in which case a lighter spring 524 may be used in this controller.

It should be noted that a system using the control elements of the present invention has certain inherent safety factors which take care of contingencies which arise in the event of a total power failure. For instance, the two relays shown in Figures 17 and 19 are equipped with valve slides which control the pressures present in the power cylinders and valve controllers. Both of these relays are so arranged that preloaded springs tend to urge the valve slides toward an intermediate position, such that the pipes to the power cylinders or valve controllers are closed off from communication with either the high pressure pipe which carries air at 60 lbs. per square inch and with the ports which establish communication with the atmosphere, or with a control fluid reservoir, as the case may be. In the event of power failure, the valve slides take an intermediate position, thereby insuring that the pressure of the control fluid in the power cylinders remains constant except for slight gradual leakage. The boiler, therefore, continues to operate until the power can be reestablished or manual control of the boiler can be established.

Although I have illustrated my invention in connection with the control of a particular type of boiler, it will be appreciated that this invention can be used for other control purposes. For instance, I have shown one of my variable pressure variable flow controllers as used for controlling the operation of a stoker motor. This type of controller can also be used for controlling other devices in which case a reactance fan similar to the fan 748 can be connected to a rotating member of the device the controller is intended to regulate.

In general, it will be seen that the pressure within the boiler is controlled by the constant pressure constant flow controller 220, which is sensitive to pressure changes within the boiler. The variable pressure variable flow controller 544 regulates the rate at which the fuel is fed to the boiler. This rate depends upon the pressure in the steam header and the reactance established by a fan driven by the fuel feeding means. A similar variable pressure variable flow controller 546 regulates the rate at which air flows through the boiler. This depends primarily upon the pressure in the steam header and reactance to this unit is established by the use of the differential pressure present at the inlet side of the boiler and the last pass of the air through the boiler, that is, after the air has passed around the last baffle.

From the above description of my invention, it will be seen that it accomplishes all of the objectives set out at an earlier point in this specification. Therefore, what I claim as new and useful and desire to secure by Letters Patent of the United States is:

1. A device for controlling the rate at which fuel is fed to a boiler of the type having means for feeding fuel to a boiler comprising, a source of constant pressure, steam pressure responsive means adapted to increase the activity of said fuel feeding means upon a decrease in steam pressure, said steam pressure responsive means including a master controller connected to the boiler, and a variable flow variable pressure controller adapted initially to be actuated by pressure from said source of constant pressure, a reactance pressure producing means, means for causing said reactance pressure producing means to be regulated by said feeding means so that the pressure produced by said reactance pressure producing means depends upon the degree of activity of said feeding means, and means forming a part of said variable flow variable pressure controller responsive to said reactance pressure adapted for stabilizing the operation of said steam pressure responsive means.

2. A device for controlling the rate at which fuel is fed to a boiler of the type having means for feeding fuel to a boiler comprising, a source of constant pressure, steam pressure responsive means adapted to increase the activity of said fuel feeding means upon a decrease in steam pressure, said steam pressure responsive means including a master controller connected to the boiler, and a variable flow variable pressure controller adapted initially to be actuated by pressure from said source of constant pressure, a reactance pressure producing means, means for driving sid reactance pressure producing means from said feeding means so that the pressure produced by said pressure producing means depends upon the degree of activity of said feeding means, and means forming a part of said variable flow variable pressure controller responsive to said reactance pressure adapted for opposing the operation of said steam pressure responsive means.

3. A device for controlling the rate at which fuel is fed to a boiler of the type having means for feeding fuel to a boiler, comprising a source of constant pressure steam pressure responsive means adapted to increase the activity of said fuel feeding means upon a decrease in steam pressure, said steam pressure responsive means including a master controller connected to the boiler, and a variable flow variable pressure controller adapted initially to be actuated by pressure from said source of constant pressure, a reactance pressure producing means, means for driving said reactance pressure producing means from said feeding means so that the pressure produced by said reactance pressure producing means depends upon the degree of activity of said feeding means, means forming a part of said variable flow variable pressure controller responsive to said reactance pressure adapted for opposing the operation of said steam pressure responsive means, and means for varying the effectiveness of the opposition of the reactance pressure upon said steam pressure responsive means.

4. A device for controlling the rate of air flow through a boiler, comprising a source of constant pressure, steam pressure responsive means operative to increase the rate of air flow when said steam pressure falls, said steam pressure responsive means including a master controller conected to the boiler, and a variable flow variable pressure controller adapted initially to be actuated by pressure from said source of constant pressure, means responsive to the boiler air pressure at at least two points in said boiler for obtaining the differential between the air pressures at said points, and means forming a part of said variable flow variable pressure controller operated by said differential pressure for stabilizing the operation of the steam pressure responsive means.

5. A device for controlling the rate of air flow through a boiler, comprising a source of constant pressure, steam pressure responsive means operative to increase the rate of air flow when said steam pressure falls, said steam pressure responsive means including a master controller connected to the boiler, and a variable flow variable pressure controller adapted initially to be actuated by pressure from said source of constant pressure, means responsive to the boiler air pressure at at least two points in said boiler for obtaining the differential between the air pressures at said points, and means forming a part of said variable flow variable pressure controller operated by said differential pressure for opposing the operation of the steam pressure responsive means.

6. A device for controlling the rate of air flow through a boiler, comprising a source of constant pressure, steam pressure responsive means operative to increase the rate of air flow when said steam pressure falls, said steam pressure responsive means including a master controller connected to the boiler, and a variable flow variable pressure controller adapted initially to be actuated by pressure from said source of constant pressure, means responsive to the boiler air pressure at at least two points in said boiler for obtaining the differential between the air pressures at said points, means forming a part of said variable flow variable pressure controller operated by said differential pressure for opposing the operation of the steam pressure responsive means, and means for varying the effectiveness of the opposition of the differential pressure upon said steam pressure reponsive means.

SWAN A. PEARSON.